US006781988B1

(12) United States Patent
Gotoh et al.

(10) Patent No.: US 6,781,988 B1
(45) Date of Patent: Aug. 24, 2004

(54) MONITORING APPARATUS, MONITORING SYSTEM, AND MONITORING METHOD

(75) Inventors: Tomonori Gotoh, Kawasaki (JP); Katsumi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/391,936

(22) Filed: Sep. 8, 1999

(30) Foreign Application Priority Data

Sep. 8, 1998 (JP) .......................................... 10-253787

(51) Int. Cl.[7] ............................................. H04L 12/26
(52) U.S. Cl. ...................................... 370/390; 370/432
(58) Field of Search ................................. 370/241, 242, 370/243, 244, 245, 351, 289, 392, 432, 463, 390; 709/223, 224, 225, 227

(56) References Cited

U.S. PATENT DOCUMENTS

| | | | | |
|---|---|---|---|---|
| 4,817,080 A | * | 3/1989 | Soha | 370/252 |
| 5,315,580 A | * | 5/1994 | Phaal | 370/232 |
| 5,537,623 A | * | 7/1996 | Chamberlain et al. | 709/220 |
| 5,926,463 A | * | 7/1999 | Ahearn et al. | 370/254 |
| 6,061,350 A | * | 5/2000 | Min | 370/389 |
| 6,078,954 A | * | 6/2000 | Lakey et al. | 709/223 |
| 6,115,393 A | * | 9/2000 | Engel et al. | 370/469 |
| 6,360,257 B1 | * | 3/2002 | Rydberg et al. | 709/223 |
| 6,418,469 B1 | * | 7/2002 | Justice, Jr. et al. | 709/224 |

FOREIGN PATENT DOCUMENTS

| | | |
|---|---|---|
| JP | 59-198044 | 11/1984 |
| JP | 62-024741 | 2/1987 |
| JP | 62-202628 | 9/1987 |
| JP | 05-091114 | 4/1993 |

OTHER PUBLICATIONS

Papulkar et al. "An Architecture for Monitoring, Visualization, and Control of Gigabit Networks". Oct. 1997. pp. 34–43.*

Lee et al. "A Multicast Protocol for Network Management System". IEEE Networks. Jul. 5–7, 1995. pp. 364–368.*

Schonwalder, J. "Using Multicast–SNMP to Coordinate Distributed Management Agents". IEEE Systems management. Jun. 19–21, 1996. pp. 136–141.*

* cited by examiner

*Primary Examiner*—Chi Pham
*Assistant Examiner*—Derrick W Ferris
(74) *Attorney, Agent, or Firm*—Katten Muchin Zavis Rosenman

(57) ABSTRACT

A monitoring apparatus and apparatuses to be monitored each have an address holding unit which holds the address of a group to which each apparatus belongs. A data frame to be transmitted between the monitoring apparatus and each of the apparatuses to be monitored includes an identifier which specifies communication between two apparatuses or group broadcast. When the identifier specifies the group broadcast, a group address is put in the data frame. In this manner, a large number of apparatuses which form a large-scale network can be divided into groups, and the group broadcast can be carried out when a plurality of monitoring apparatuses are used for monitoring the apparatuses, thereby eliminating the need of polling.

24 Claims, 24 Drawing Sheets

MONITORING APPARATUS, MONITORING SYSTEM, AND MONITORING METHOD

BACKGROUND OF THE INVENTION

1. Field of the Invention

The present invention generally relates to an apparatus, a system, and a method for monitoring the conditions of a plurality of apparatuses which constitute a network.

2. Description of the Related Art

FIG. 1 illustrates an example of a monitoring system of the prior art. In FIG. 1, apparatuses 11 to 16 to be monitored are transmission apparatuses that constitute a network, for instance. The apparatuses 11 to 16 are connected to monitoring apparatuses 17 and 18 by a monitoring line 19, thereby forming a monitoring system.

There have been three conventional monitoring methods in which the monitoring apparatuses 17 and 18 monitor independently of each other the apparatuses 11 to 16 in a system of the above type. In a first monitoring method, the monitoring line is divided into two lines 19a and 19b, so that the monitoring apparatus 17 monitors and controls the apparatuses 11 to 13, and that the monitoring apparatus 18 monitors and controls the apparatuses 14 to 16, as shown in FIG. 2.

In a second monitoring method shown in FIG. 3, the monitoring line 19 is not divided, and the monitoring apparatus 17 monitors and controls the apparatuses 11 to 13 by polling them sequentially, while the monitoring apparatus 18 monitors and controls the apparatuses 14 to 16 by polling them sequentially.

In a third monitoring method shown in FIG. 4, the monitoring line 19 is not divided. The apparatuses 11 to 13 each have the address of the monitoring apparatus 17, and spontaneously send information to the address. In return, the monitoring apparatus 17 selectively controls the apparatuses 11 to 13. Likewise, the apparatuses 14 to 16 each have the address of the monitoring apparatus 18, and spontaneously send information to the address. In return, the monitoring apparatus 18 selectively controls the apparatuses 14 to 16.

The three conventional monitoring methods each have problems. In the first conventional monitoring method, the monitoring apparatus 17 cannot monitor the apparatuses 14 to 16, and the monitoring apparatus 18 cannot monitor the apparatuses 11 to 13, because the monitoring line is divided into the two separate monitoring lines 19a and 19b. This causes a problem that even if some trouble occurs in one of the monitoring apparatuses, the monitoring ranges cannot swiftly be changed.

As for the second conventional monitoring method, it takes the monitoring apparatuses a long time to recognize a trouble occurrence in one of the apparatuses 11 to 16, because the monitoring apparatuses 17 and 18 gather information by polling the apparatuses 11 to 16 one by one. Also, a larger number of apparatuses to be monitored applies a heavier load to the monitoring apparatuses, causing a problem that the monitoring apparatuses cannot adjust themselves to a larger system.

In the third conventional monitoring method, the apparatuses 11 to 16 to be monitored need to have the address of the monitoring apparatus 17 or 18 that is monitoring themselves, because the apparatuses 11 to 16 to be monitored each designate the address of the monitoring apparatus 17 or 18, and spontaneously send information to the monitoring apparatus of the designated address. In a case where more monitoring apparatuses are added, the apparatuses to be monitored have to send information to both the original monitoring apparatuses and the newly added monitoring apparatuses, resulting in more traffic. Also, since the monitoring range of each monitoring apparatus is fixed, changing the system configuration and distributing the monitoring apparatuses are difficult.

SUMMARY OF THE INVENTION

A general object of the present invention is to provide a monitoring apparatus, a monitoring system, and a monitoring method in which the above disadvantages are eliminated.

A more specific object of the present invention is to provide a monitoring apparatus, a monitoring system, and a monitoring method in which the monitoring ranges can swiftly be changed when trouble occurs in the monitoring apparatus, the time required for the monitoring apparatus to recognize the occurrence of trouble can be shortened, a larger system can be employed, and changing the system configuration and distributing the monitoring apparatuses can easily be carried out.

The above objects of the present invention are achieved by a monitoring system in which a monitoring apparatus monitors a plurality of apparatuses. In this monitoring system, the monitoring apparatus and the apparatuses to be monitored each have an address holding unit which holds the address of a group to which each apparatus belongs. A data frame to be transmitted between the monitoring apparatus and the apparatuses to be monitored has an identifier which specifies apparatus addressing communication or group broadcast. When the identifier specifies the group broadcast, a group address is put in the data frame.

In the above monitoring system, a plurality of monitoring apparatuses can be used for monitoring a large number of apparatuses which form a large-scale network and are divided into groups, and the group broadcast is carried out, thereby eliminating the need of polling. Thus, a load applied to each monitoring apparatus can be lighter than in the prior art, and a configuration change, such as increasing or reducing the number of monitoring apparatuses, can easily be made to the monitoring system.

The above objects of the present invention are also achieved by a monitoring apparatus which monitors a plurality of apparatuses. This monitoring apparatus comprises: a monitoring range holding unit which holds apparatus addresses of the plurality of apparatuses to be monitored as monitoring range data; a monitoring range comparing unit which judges whether a transmitter address in a transmitted data frame is included in the monitoring range data held in the monitoring range holding unit; and a condition display unit which displays a condition of a monitored apparatus based on contents of the transmitted data frame when the transmitter address is held in the managing range holding unit.

With the above monitoring apparatus, the system configuration can be flexibly changed depending on the form of the network constituted by the apparatuses to be monitored.

The above objects of the present invention are also achieved by a method of monitoring a monitoring system in which a monitoring apparatus monitors a plurality of apparatuses. This monitoring method comprising the steps of: storing a group address of a group to which each of the monitoring apparatus and the apparatuses to be monitored belongs; setting an identifier in a data frame to be transmitted between the monitoring apparatus and the apparatuses to be monitored, the identifier specifying communication between two apparatuses or group broadcast; and storing a group address in the data frame when the identifier specifies the group broadcast.

According to the above monitoring method, a plurality of monitoring apparatuses can be used for monitoring a large number of apparatuses which form a large-scale network and are divided into groups, and the group broadcast is carried out, thereby eliminating the need of polling. Thus, a load applied to each monitoring apparatus can be lighter than in the prior art, and a configuration change, such as increasing or reducing the number of monitoring apparatuses, can easily be made to the monitoring system.

The above and other objects and features of the present invention will become more apparent from the following description taken in conjunction with the accompanying drawings.

DESCRIPTION OF THE PREFERRED EMBODIMENTS

Figure 1:
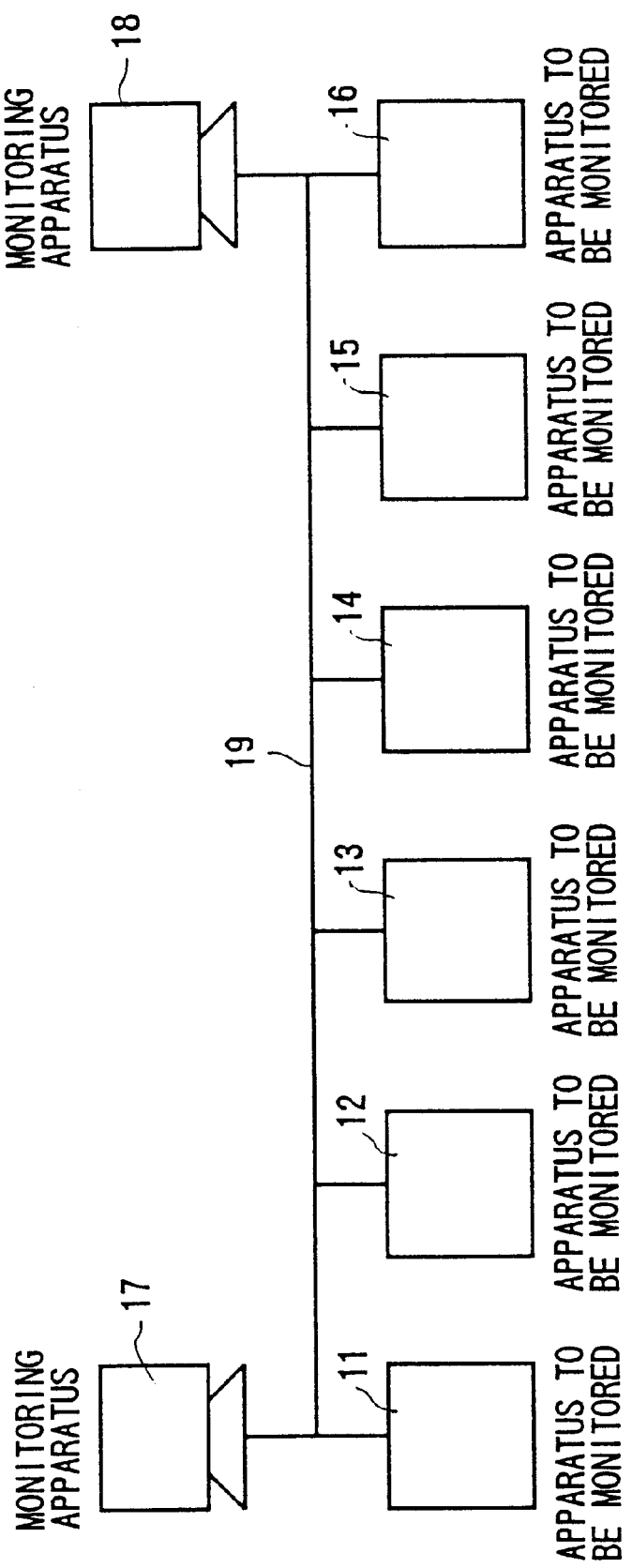
FIG. 1 is an example configuration of a monitoring system of the prior art.
Figure 2:
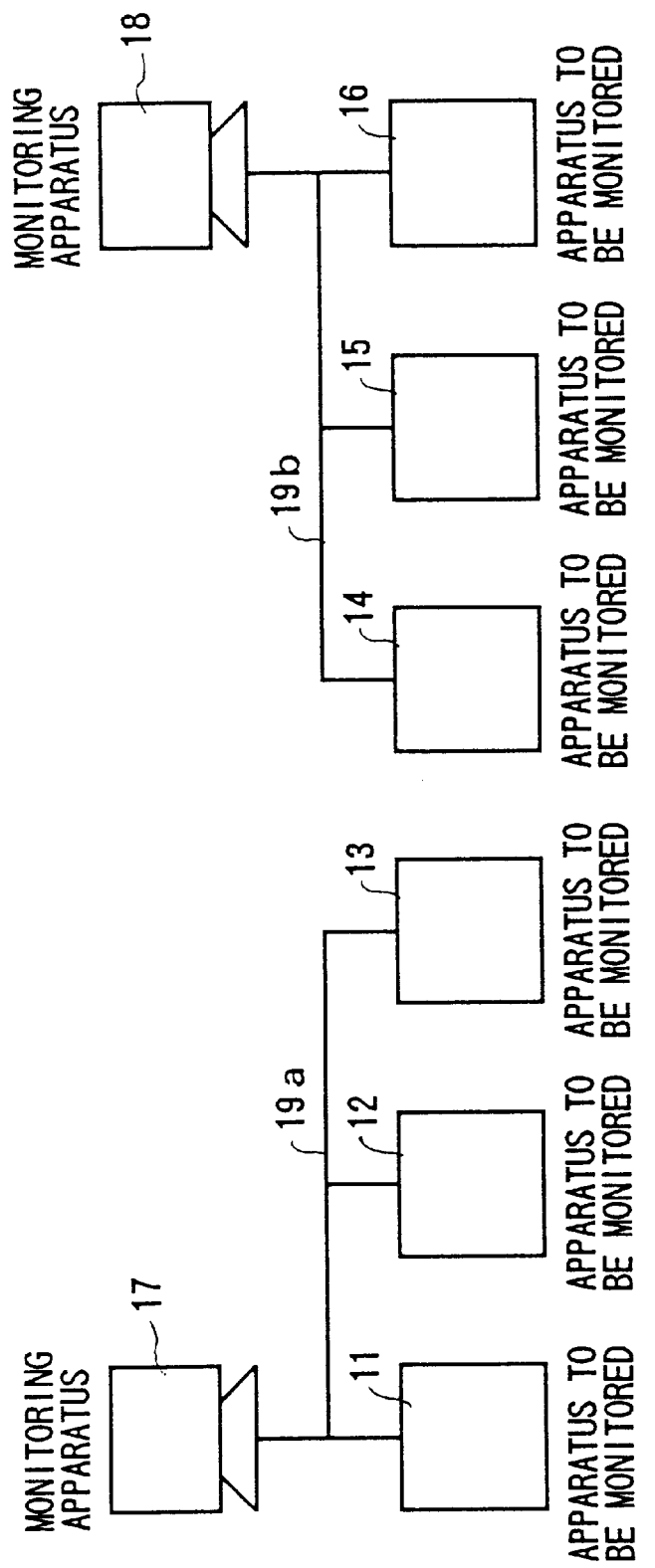
FIG. 2 shows a first example monitoring system of the prior art.
Figure 3:
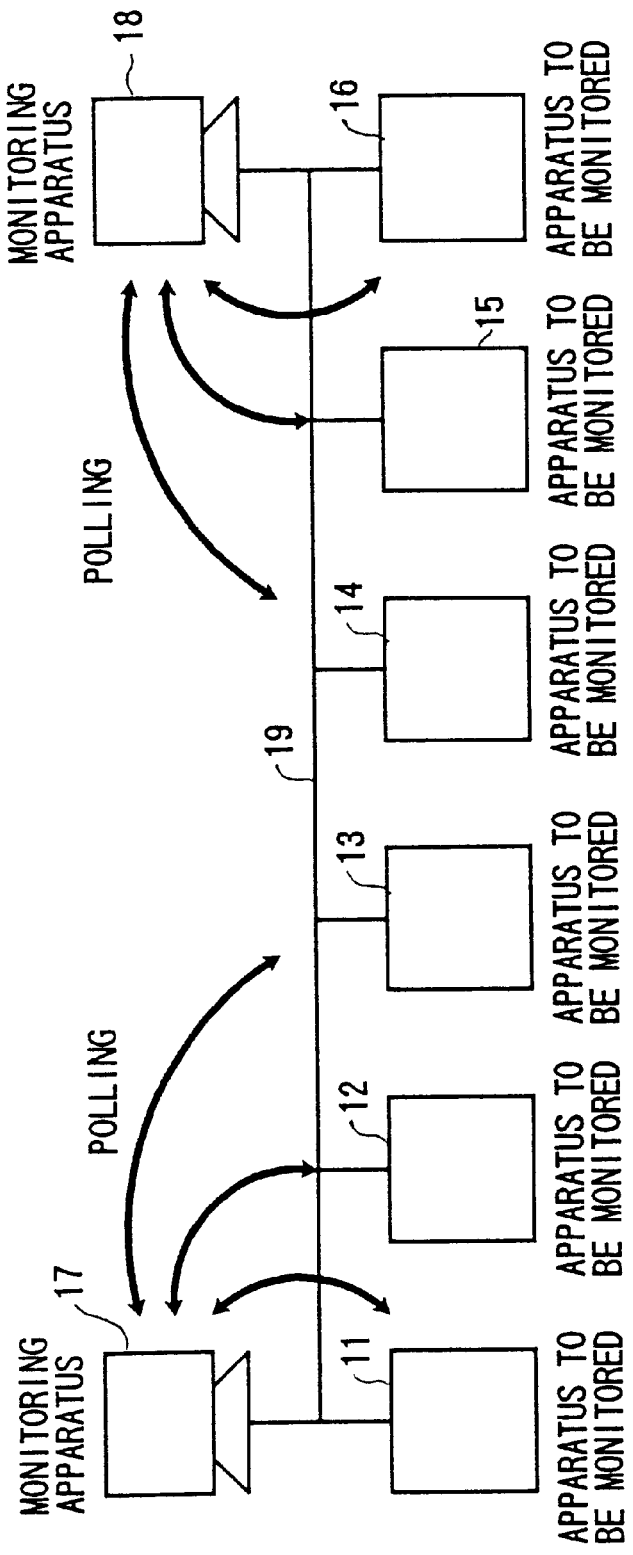
FIG. 3 shows a second example monitoring system of the prior art.
Figure 4:
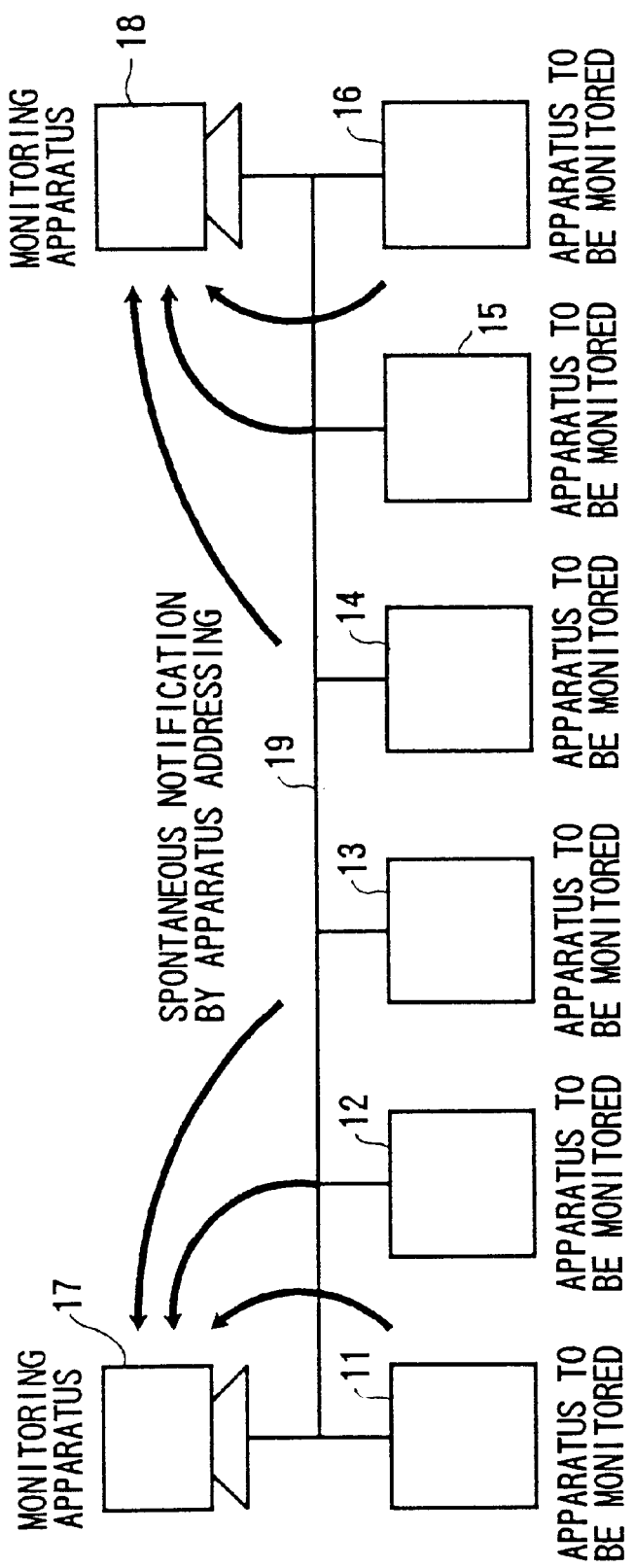
FIG. 4 shows a third example monitoring system of the prior art.
Figure 5:
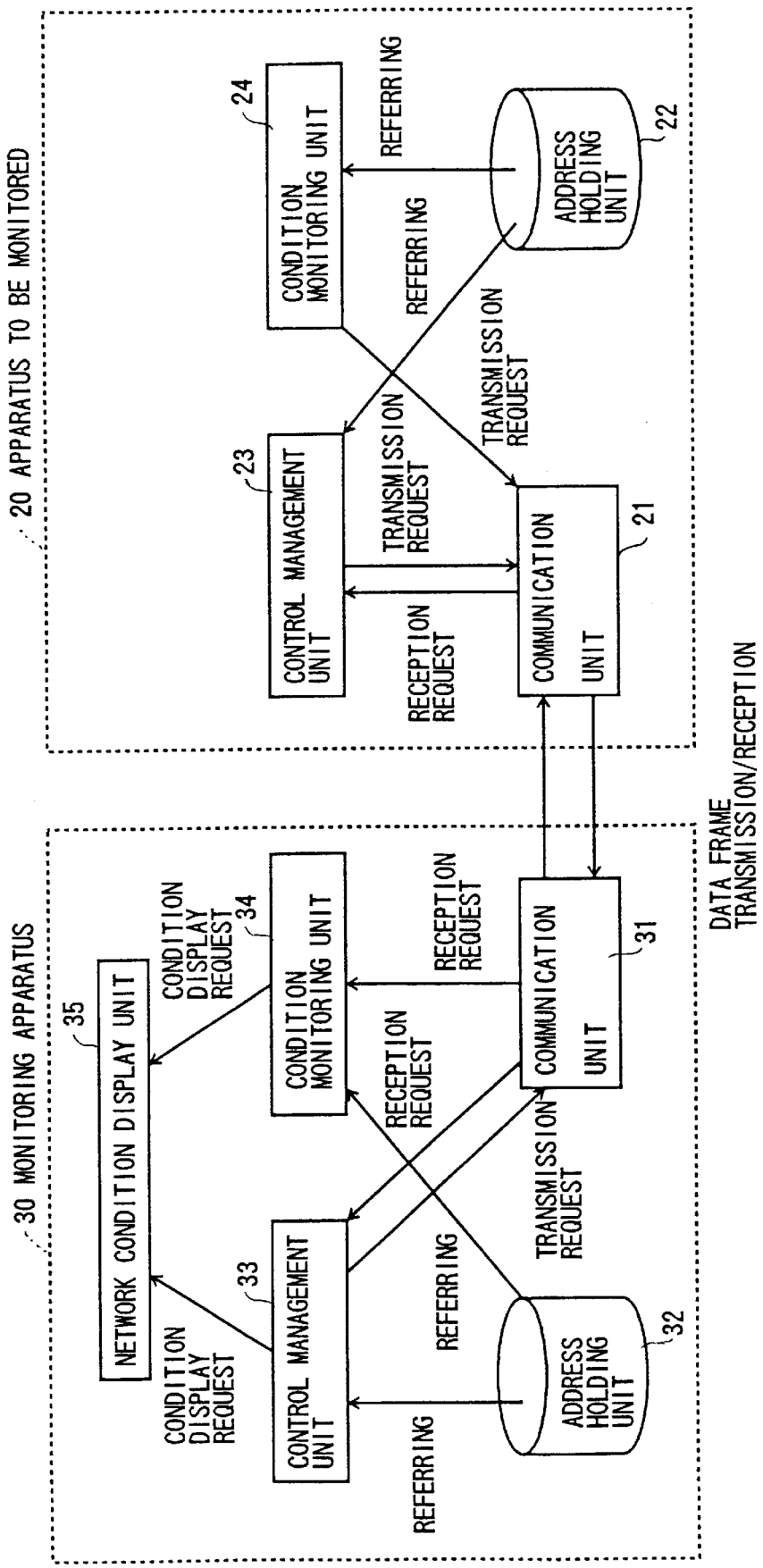
FIG. 5 is a block diagram of a first embodiment of a monitoring apparatus and an apparatus to be monitored in a monitoring system of the present invention.

FIG. 5 is a block diagram of a first embodiment of a monitoring apparatus and an apparatus to be monitored in a system of the present invention. As shown in FIG. 5, a communication unit 21 in an apparatus 20 to be monitored communicates with a monitoring apparatus 30. When the communication unit 21 receives a data frame which carries a process request from the monitoring apparatus 30, it sends the received process request to a control management unit 23. An address holding unit 22 stores the address of the apparatus 20 and the address of at least one group to which the apparatus 20 belongs.

If the transmission destination address in the data frame received by the communication unit 21 coincides with the apparatus address or the group address stored in the address holding unit 22, the control management unit 23 carries out the process in response to the process request in the data frame, and sends the results of the process to the communication unit 21, thereby making a transmission request. The transmission request is accompanied by the group address stored in the address holding unit 22. The communication unit 21 then transmits a data frame which carries the result information.

A condition monitoring unit 24 monitors condition changes in the apparatus 20. If there is a condition change, the condition monitoring unit 24 sends condition change information to the communication unit 21, thereby making a transmission request. The transmission request is accompanied by the group address stored in the address holding unit 22. The communication unit 21 then transmits a data frame which carries the condition change information.

A communication unit 31 in the monitoring apparatus 30 communicates with the apparatus 20 to be monitored. An address holding unit 32 stores the address of the monitoring apparatus 30 and the address of a group to which the monitoring apparatus 30 belongs. A control management unit 33 sends a process request for the apparatus to be monitored to the communication unit 31, thereby making a transmission request. The transmission request is accompanied by the group address stored in the address holding unit 32. The communication unit 31 then transmits a data frame which carries the process request.

When the communication unit 31 receives the data frame containing the execution result information from the apparatus 20 in response to the process request, it then sends a reception request to the control management unit 33. If the transmission destination address in the data frame received by the communication unit 31 coincides with the apparatus address or the group address stored in the address holding unit 32, the control management unit 33 requests a network condition display unit 35 to display the current network condition.

When the communication unit 31 receives the data frame containing the condition change information from the apparatus 20 to be monitored, it sends a reception request to the condition monitoring unit 34. If the transmission destination address in the data frame coincides with the apparatus address or the group address stored in the address holding unit 32, the condition monitoring unit 34 requests the network display unit 35 to display the current network condition.

Figure 6:
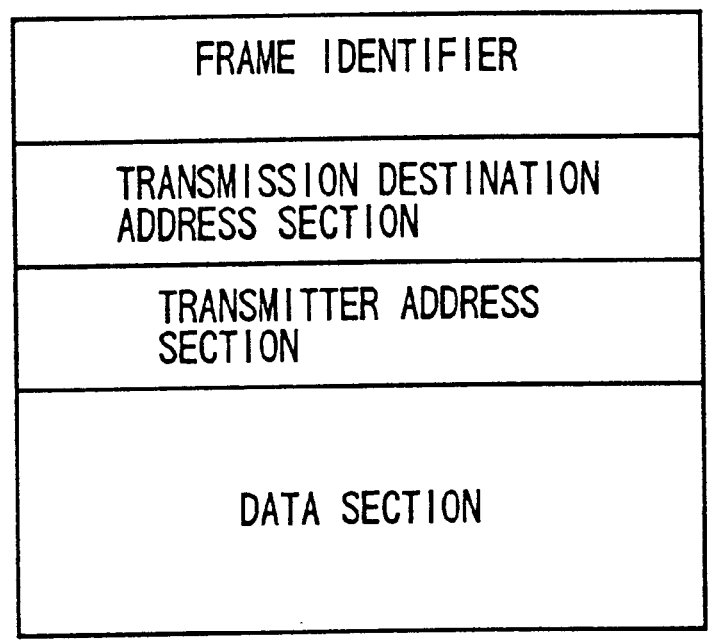
FIG. 6 shows an example format of a data frame.

FIG. 6 shows an example format of a data frame transmitted between the communication unit 21 of the apparatus 20 to be monitored and the communication unit 31 of the monitoring apparatus 30. In FIG. 6, a frame identifier specifies the data frame as an addressing communication, a group broadcast, or a network broadcast. A transmission destination address section holds the address of the destination apparatus in a case of the apparatus addressing communication, or the address of the destination group in a case of the group broadcast. A transmitter address section holds the group address of the group to which the transmitter apparatus belongs. A data section holds transmission information.

Figure 7:
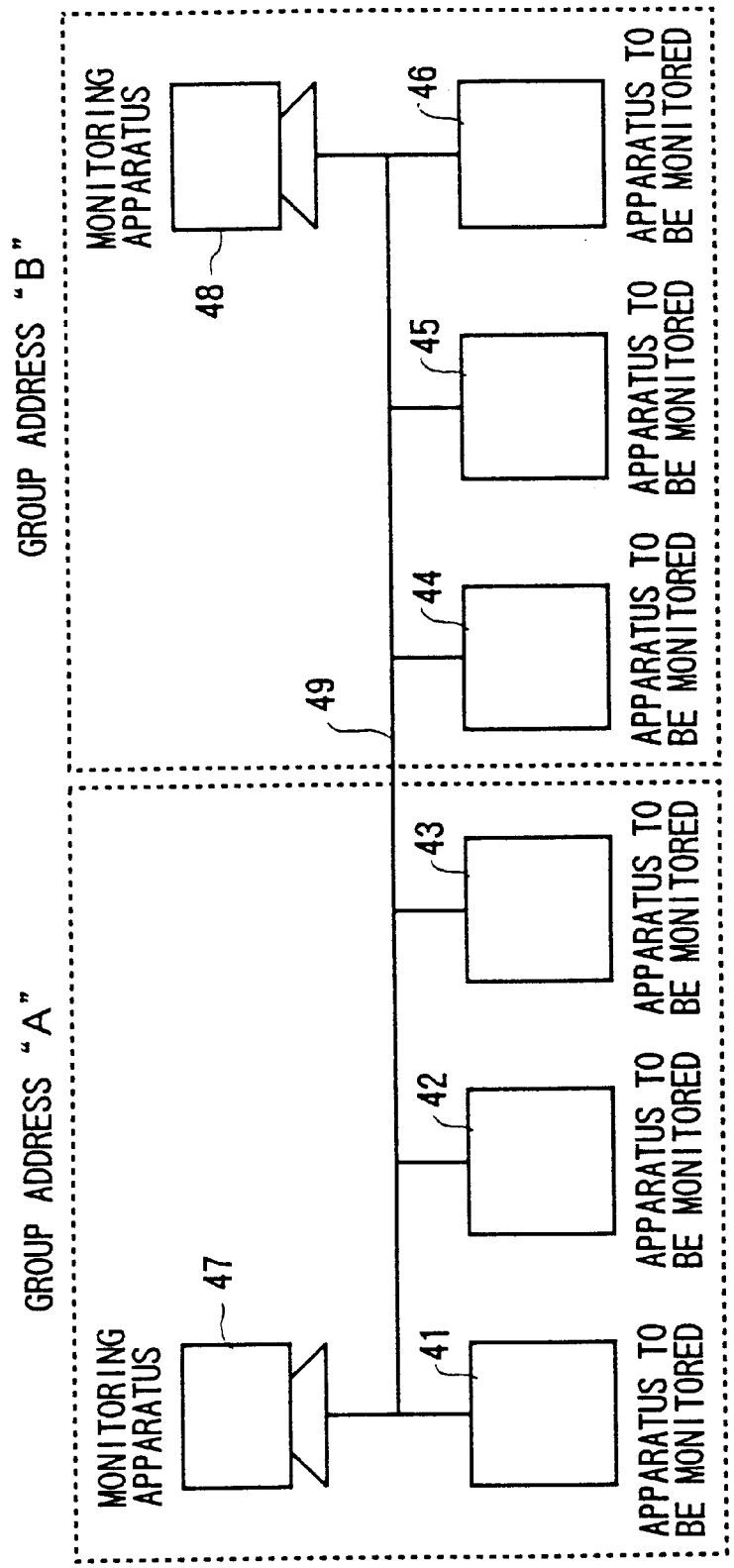
FIG. 7 shows a first example group configuration in a monitoring system of the present invention.

FIG. 7 illustrates a first example group configuration of the monitoring system of the present invention. In FIG. 7, apparatuses 41 to 16 to be monitored are transmission apparatuses which constitute a network. The apparatuses 41 to 46 to be monitored are connected to monitoring apparatuses 47 and 48 by a monitoring line 49, thereby forming a monitoring system.

Each of the address holding units 22 and 32 of the apparatuses 41 to 43 and the monitoring apparatus 47 holds each corresponding apparatus address and a group address "A". Each of the address holding units 22 and 32 of the apparatuses 44 to 46 and the monitoring apparatus 48 holds each corresponding apparatus address and a group address "B". Accordingly, the monitoring apparatus 47 monitors and controls the apparatuses 41 to 43, while the monitoring apparatus 48 monitors and controls the apparatuses 44 to 46.

Figure 8:
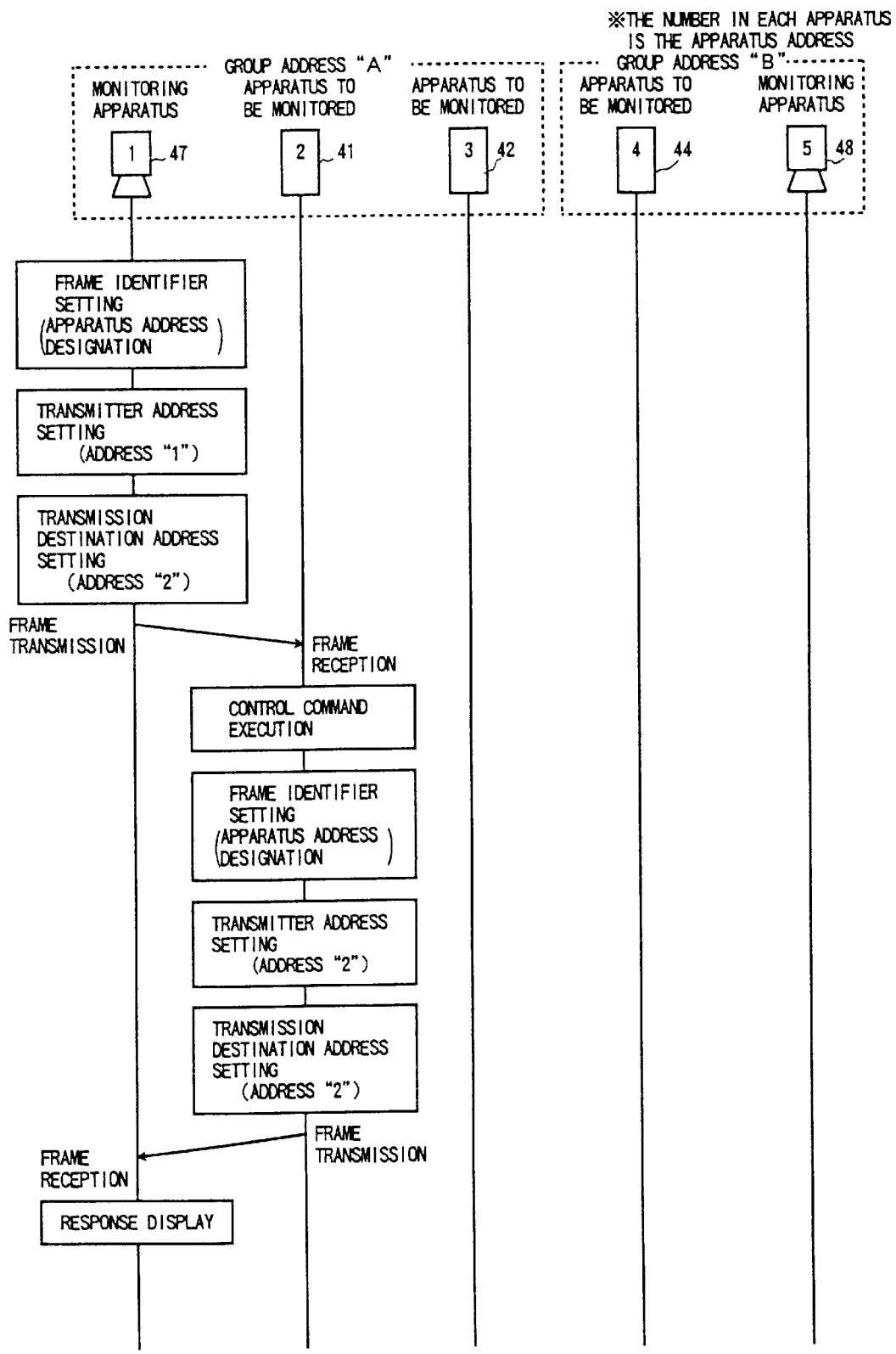
FIG. 8 is a sequential diagram of a case where a monitoring apparatus separately controls apparatuses to be monitored.

FIG. 8 shows a sequential diagram of a case where each monitoring apparatus separately control each of the apparatuses to be monitored. In FIG. 8, the control management unit 33 of the monitoring apparatus 47 sets the frame identifier to the apparatus addressing communication; sets the transmitter address section at its own apparatus address "1"; sets the transmission destination address section at the apparatus address "2" of the apparatus 41; and puts control instructions into the data section. The communication unit 31 then transmits the control instructions through the monitoring line 49.

When the communication unit 21 of the apparatus 41 to be monitored receives the data frame, the control management unit 23 executes the control instructions specified in the data section of the data frame, because the frame identifier designates the apparatus addressing communication and the transmission destination address section indicates the apparatus 41 itself. The control management unit 23 then sets the frame identifier of the data frame to the apparatus addressing communication; sets the transmitter address section at its own apparatus address "2"; sets the transmission destination address section at the address "1" of the monitoring apparatus 47; and puts the response contents (execution result information) into the data section. The communication unit 21 then transmits the response contents through the monitoring line 49.

When the communication unit 31 of the monitoring apparatus 47 receives the response data frame, the control management unit 33 requests the network condition display unit 35 to display the response contents of the data section, because the frame identifier indicates the apparatus addressing communication and the transmission destination address section indicates the monitoring apparatus 47 itself.

Figure 9:
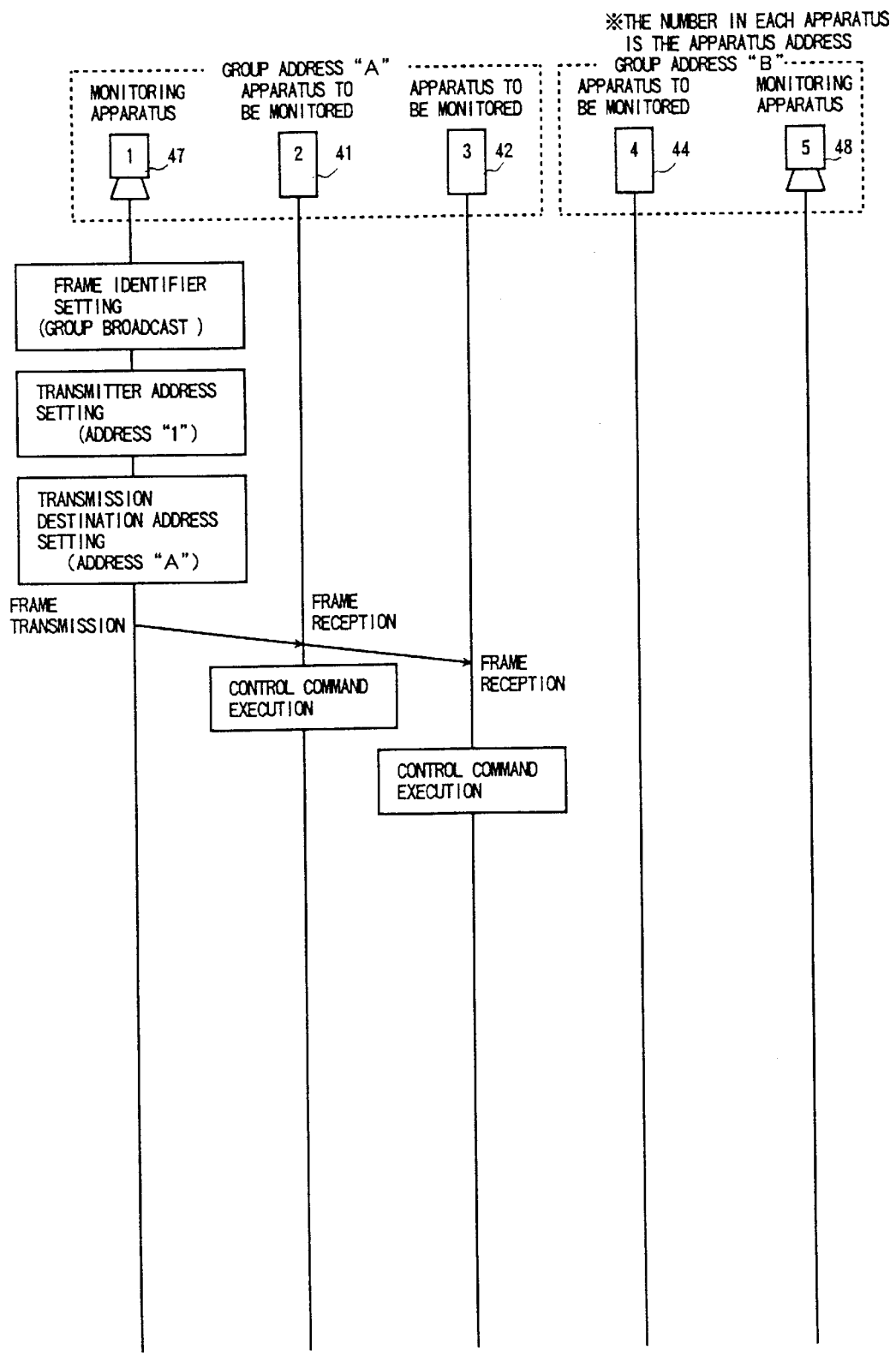
FIG. 9 is a sequential diagram if a case where a monitoring apparatus controls all the apparatuses to be monitored in the group.

FIG. 9 shows a sequential diagram of a case where each monitoring apparatuses control all the apparatuses to be monitored in each group. In FIG. 9, the control management unit 33 of the monitoring apparatus 47 sets the frame identifier of a data frame to the group broadcast; sets the transmitter address section at its own apparatus address "2"; sets the transmission destination address section at the group address "A"; and puts control instructions into the data section. The communication unit 31 then transmits the control instructions through the monitoring line 49. When each communication unit 21 of the apparatuses 41 and 42 to be monitored receives the data frame, each control management unit 23 carries out the control instructions specified in the data section of the data frame, because the frame identifier of the data frame indicates the group broadcast and the transmission destination address section indicates the group to which the apparatuses 41 and 42 belong.

Figure 10:
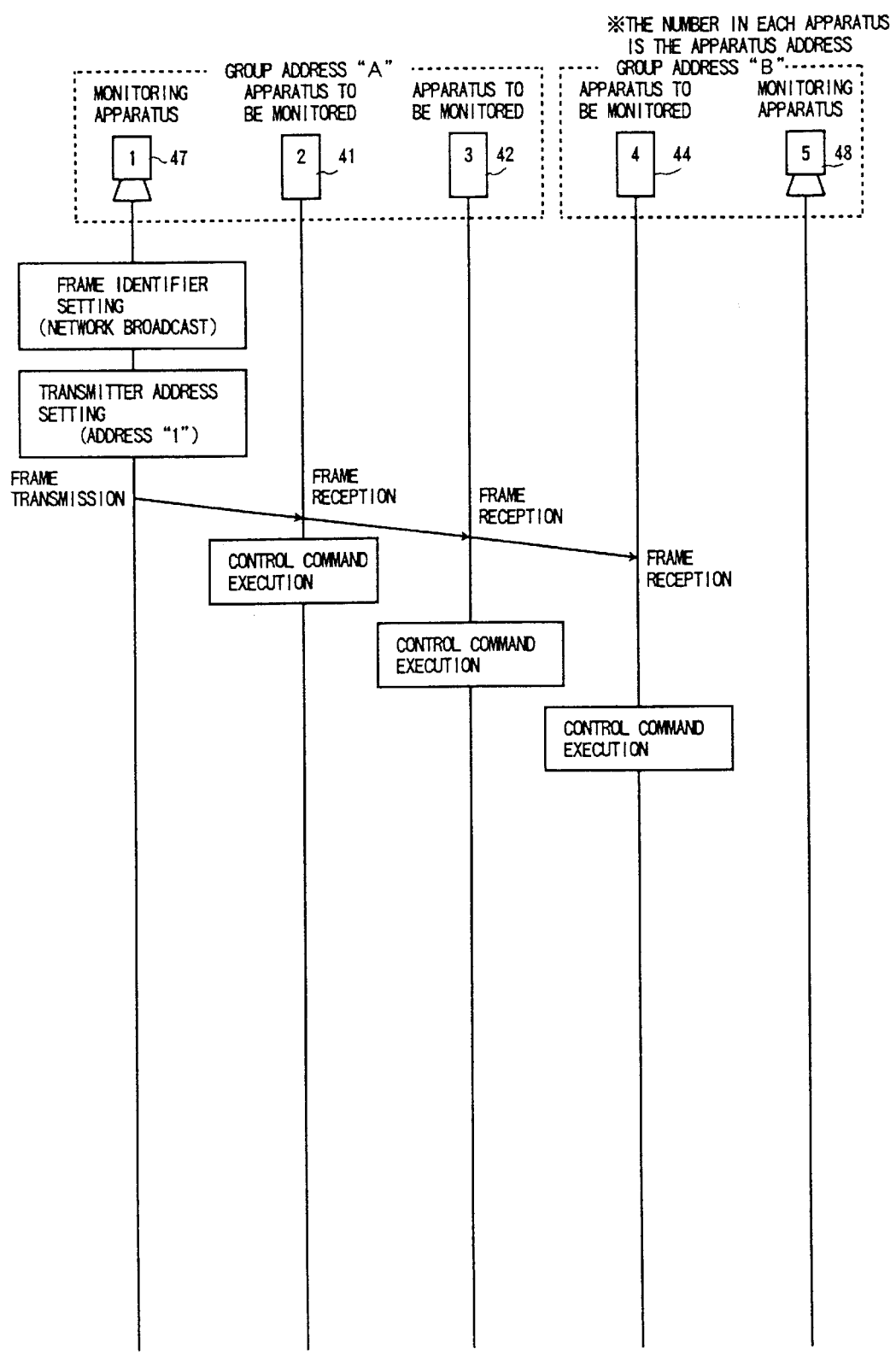
FIG. 10 is a sequential diagram of a case where a monitoring apparatus controls all the apparatuses to be monitored in the network.

FIG. 10 shows a sequential diagram of a case where each monitoring apparatus controls all the apparatuses to be monitored in the network. In FIG. 10, the control management unit 33 of the monitoring apparatus 47 sets the frame identifier of a data frame to the network broadcast; sets the transmitter address section at its own apparatus address "2"; and puts control instructions in the data section. The communication unit 31 then transmits the control instruction through the monitoring line 49. When each communication unit 21 of all the apparatuses 41, 42, and 44 in the network shown in FIG. 10 receives the data frame, each control management unit 23 executes the control instructions specified in the data section of the data frame, because the frame identifier indicates the network broadcast.

Figure 11:
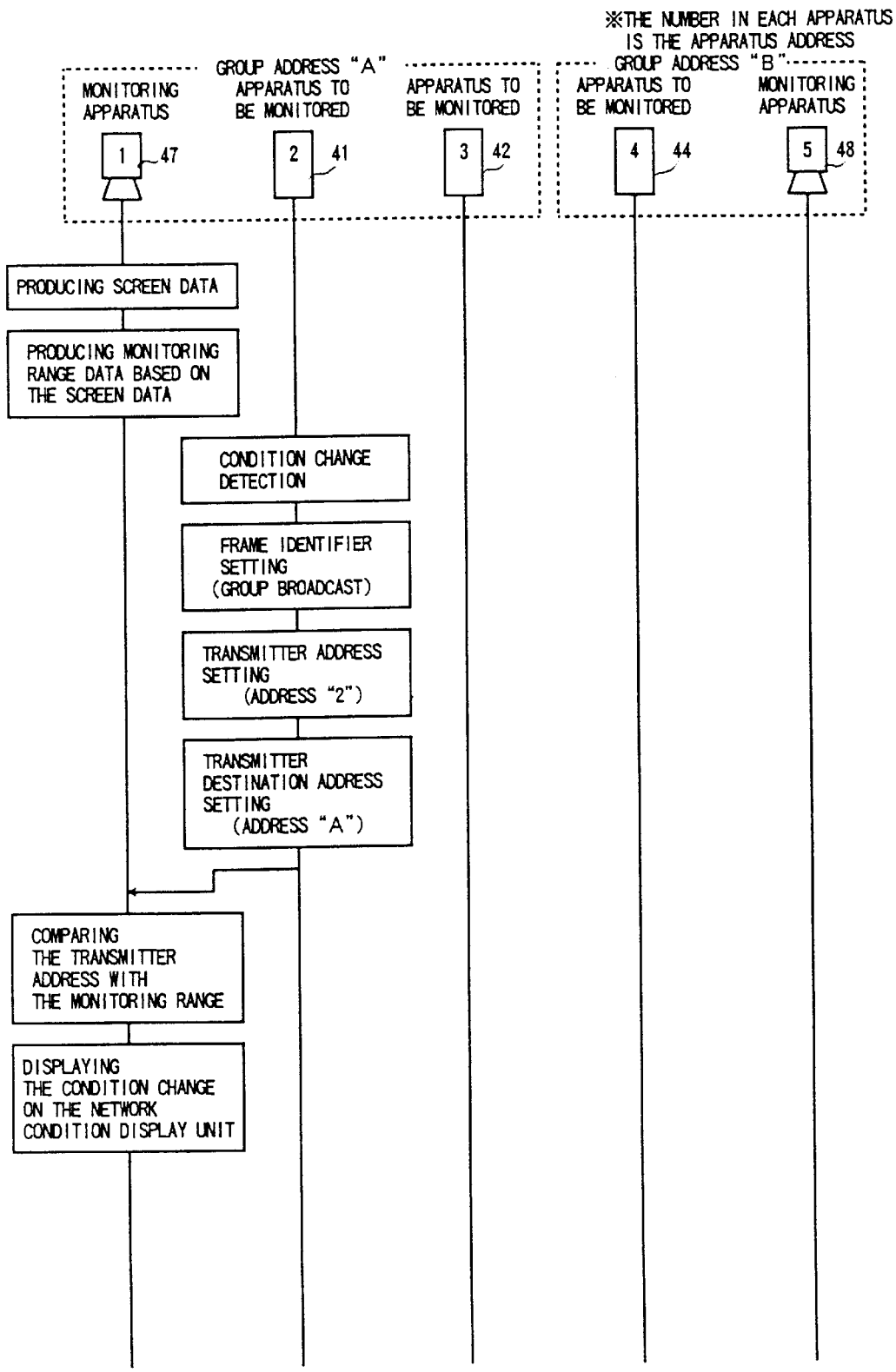
FIG. 11 is a sequential diagram of a case where apparatuses to be monitored each carry out a group broadcast.

FIG. 11 shows a sequential diagram of a case where an apparatus to be monitored carried out a group broadcast. As shown in FIG. 11, the monitoring apparatus 47 produces screen data, and then produces monitoring range data based on the screen data. The monitoring range data will be later described in detail.

When the condition management unit 24 of the apparatus 41 to be monitored detects a condition change in the apparatus 41, it sends the condition change information to the communication unit 21, thereby spontaneously making a transmission request. Here, the condition management unit 24 sets the frame identifier of a data frame to the group broadcast; sets the transmitter address section at its own apparatus address "2"; sets the transmission destination address section at the group address "A"; and puts the condition change contents in the data section. The communication unit 21 then transmits the condition change contents through the monitoring line 49.

When the communication unit 31 of the monitoring apparatus 47 receives the data frame, the control management unit 33 judges whether the transmitter address is within the range specified by the monitoring range data that have been produced beforehand, because the frame identifier indicates the group broadcast and the transmission destination address indicates the group to which the monitoring apparatus 47 belongs. If the transmitter address is within the monitoring range, the control management unit 33 requests the network display 35 to display the condition change contents contained in the data section. Meanwhile, when the apparatus 42 to be monitored receives the same data frame, it discards the data frame, because the contents of the data section are not control commands.

By putting a group address into the data frame to carry out a group broadcast, a number of apparatuses to be monitored in a large-scale network form a group. By carrying out a group broadcast, a plurality of monitoring apparatuses can monitor without polling each apparatus to be monitored. Thus, the load to be applied to the monitoring apparatuses can be lightened. Also, changing the system configuration, such as increasing or reducing the number of monitoring apparatuses, can easily be carried out.

Figure 12:
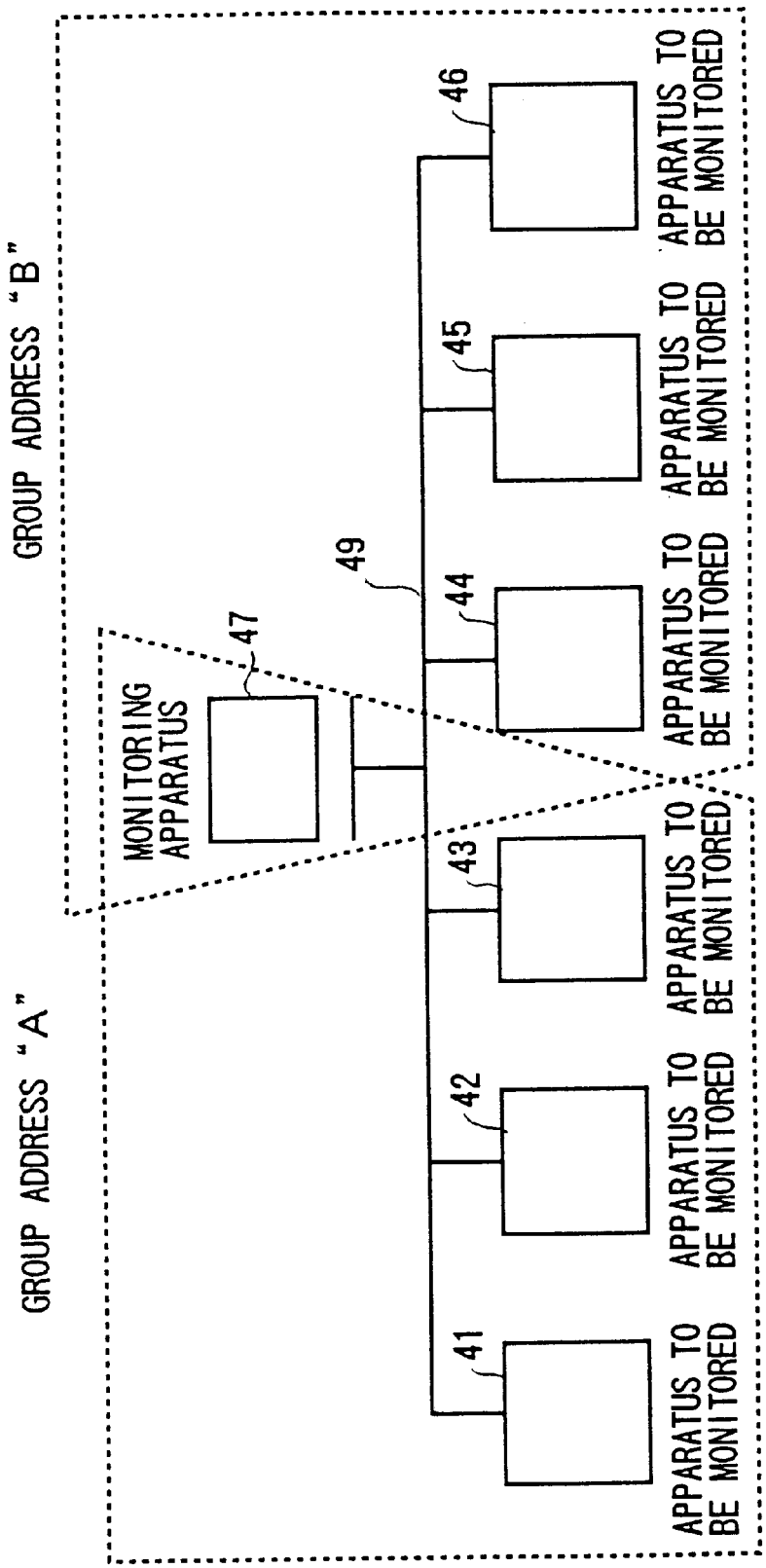
FIG. 12 shows a second example group configuration of a monitoring system of the present invention.

FIG. 12 shows a second example group configuration of the monitoring system of the present invention. In this group configuration, each of the address holding units 22 and 32 of the apparatuses 41 to 43 to be monitored and the monitoring apparatus 47 stores its own apparatus address and the group address "A". Each of the address holding units 22 and 32 of the apparatuses 44 to 46 to be monitored and the monitoring apparatus 47 holds its own apparatus address and the group address "B". Accordingly, the address holding unit 32 of the monitoring apparatus 47 has both group addresses "A" and "B". The monitoring apparatus 47 monitors and controls the apparatuses 41 to 43 in the group A, and also monitors and controls the apparatuses 44 to 46 in the group B.

When the monitoring apparatus 47 controls the apparatuses 41 to 46 separately, the frame identifier in the data frame is set to the apparatus addressing communication, the transmitter address section is set at its own apparatus address, and the transmission destination address section is at the address of the destination apparatus. When the monitoring apparatus 47 controls the apparatus at the group address "A" or "B", the frame identifier in the data frame is set to the group broadcast, the transmitter address section is set at its own apparatus address, and the transmission destination address section is set at the group address "A" or "B".

When the monitoring apparatus 47 controls all the apparatuses to be monitored in the network, the frame identifier in the data frame is set to the network broadcast, and the transmitter address section is set at its own apparatus address. When the apparatuses 41 to 43 to be monitored send condition information to the monitoring apparatus 47 spontaneously, the frame identifier in each data frame is set to the group broadcast, the transmitter address section is set at the address of each own apparatus address, and the transmission destination section is set at the group address "A".

Figure 13:
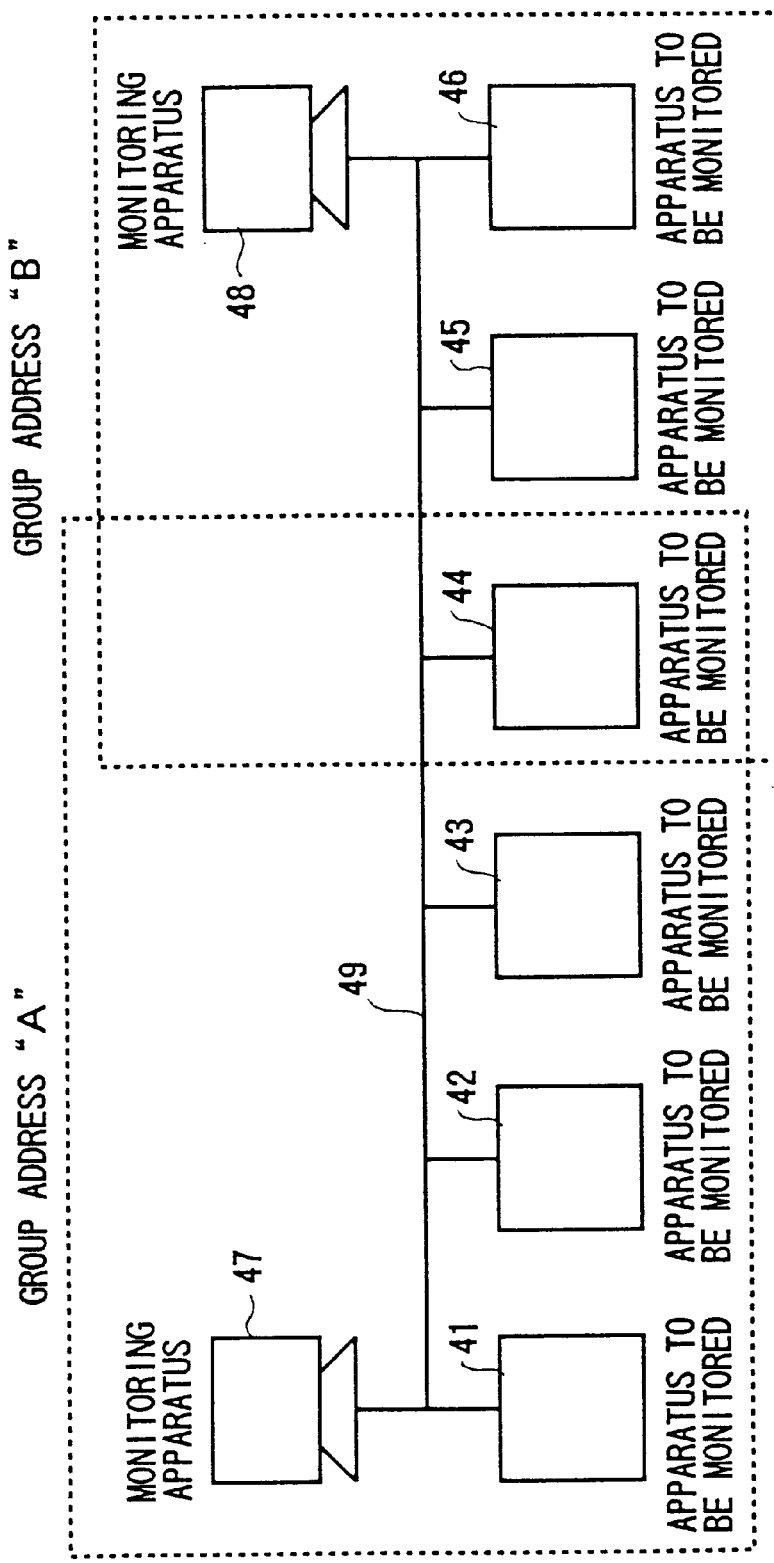
FIG. 13 shows a third example group configuration of a monitoring system of the present invention.

FIG. 13 shows a third example group configuration of the monitoring system of the present invention. In this configuration, each of the address holding units 22 and 32 of the apparatuses 41 to 44 to be monitored and the monitoring apparatus 47 holds its own apparatus address and the group address "A". Each of the address holding units 22 and 32 of the apparatuses 44 to 46 to be monitored and the monitoring apparatus 48 holds its own apparatus address and the group address "B". Accordingly, the monitoring apparatus 47 monitors and controls the apparatuses 41 to 44 in the group A, while the monitoring apparatus 48 monitors and controls the apparatuses 44 to 46 in the group B. The address holding unit 22 of the apparatus 44 to be monitored holds both group addresses "A" and "B", so that the apparatus 44 to be monitored belongs to both groups A and B.

When the monitoring apparatus 47 separately controls the apparatuses 41 to 46 to be monitored, the frame identifier in the data frame is set to the apparatus addressing communication, the transmitter address section is set at its own apparatus address, and the transmission destination address section is set at the apparatus address of a destination apparatus to be monitored. When the monitoring apparatus 47 controls the apparatuses to be monitored in the group A, the frame identifier in the data frame is set to the group broadcast, the transmitter address section is set at its own apparatus address, and the transmission destination address section is set at the group address "A". The monitoring apparatus 48 controls the apparatuses to be monitored in the group B in the same manner as above.

When the monitoring apparatus 47 or 48 controls all the apparatuses to be monitored in the network, the frame identifier in the data frame is set to the network broadcast, and the transmitter address section is set at its own apparatus address. When the apparatus 44 to be monitored sends condition information to the monitoring apparatus 48 spontaneously, the frame identifier in the data frame is set to the group broadcast, the transmitter address section is set at its own apparatus address, and the transmission destination address section is set at the group address "B".

Figure 14:
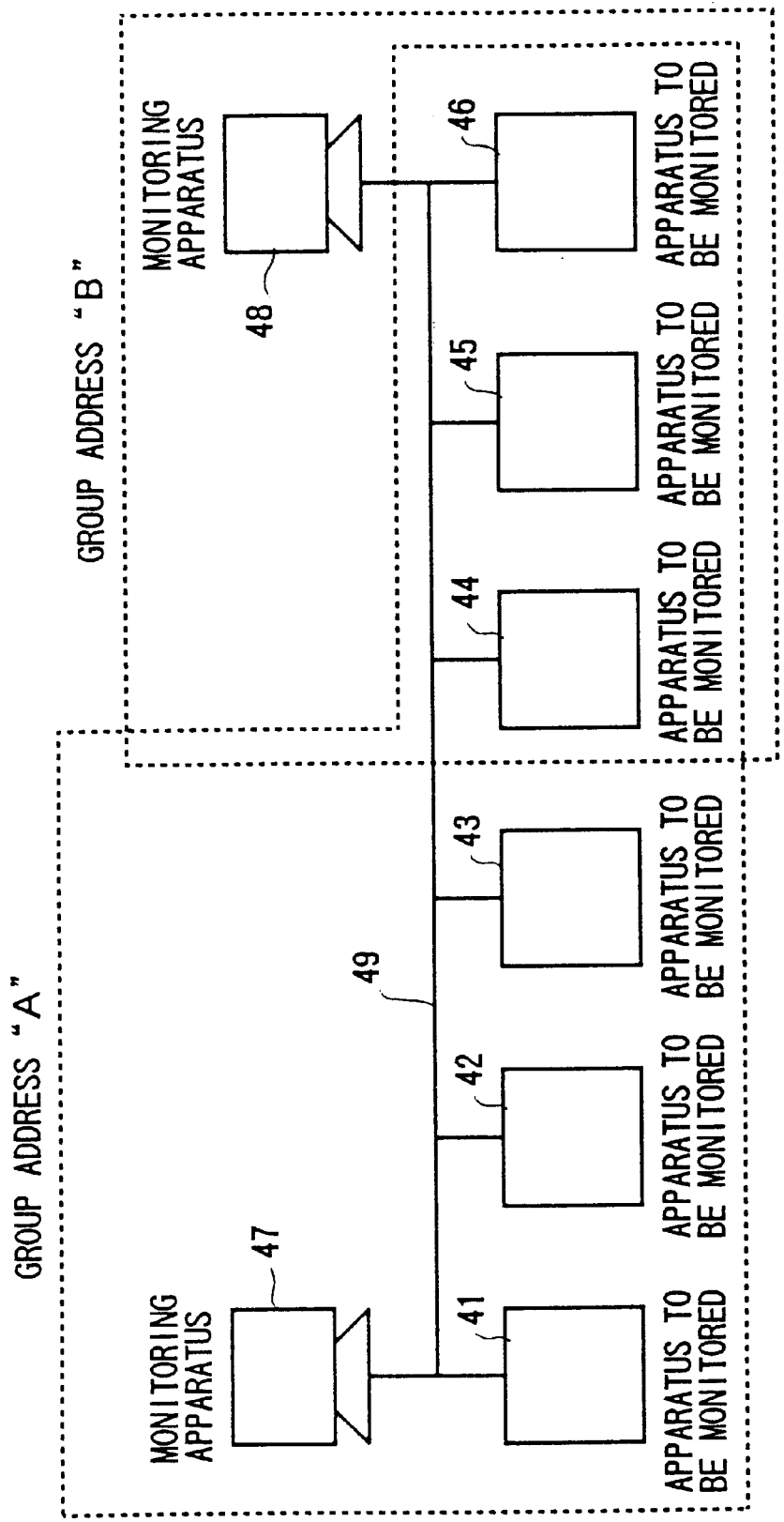
FIG. 14 shows a fourth example group configuration of a monitoring system of the present invention.

FIG. 14 shows a fourth example group configuration of the monitoring system of the present invention. In this configuration, each of the address holding units 22 and 32 of the apparatuses 41 to 43 to be monitored and the monitoring apparatus 47 hold its own apparatus address and the group address "A". Each of the address holding units 22 of the apparatuses 44 to 46 to be monitored holds its own apparatus address and the group addresses "A" and "B". The address holding unit 32 of the monitoring apparatus 48 holds its own apparatus address and the group address "B". Accordingly, the monitoring apparatus 47 monitors and controls the apparatuses 41 to 46 in the group A, and the monitoring apparatus 48 monitors and controls the apparatuses 44 to 46 in the group B. The apparatuses 44 to 46 to be monitored belong to both groups A and B. Here, the monitoring apparatus 47 serves as a main monitoring apparatus which manages the entire network, and the monitoring apparatus 48 serves as a sub monitoring apparatus which manages the group B.

When the monitoring apparatus 47 separately controls the apparatuses 41 to 46 to be monitored, the frame identifier in the data frame is set to the apparatus addressing communication, the transmitter address section is set at its own apparatus address, and the transmission destination address section is set at the apparatus address of a destination apparatus to be monitored. When the monitoring apparatus 47 controls the apparatuses to be monitored in the group A, the frame identifier in the data frame is set to the group broadcast, the transmitter address section is set at its own apparatus address, and the transmission destination address section is set at the group address "A". The monitoring apparatus 48 controls the apparatuses to be monitored in the group B in the same manner as above.

When the monitoring apparatus 47 or 48 controls all the apparatuses to be monitored in the network, the frame identifier in the data frame is set to the network broadcast, and the transmitter address section is set at its own apparatus address. When the apparatuses 44 to 46 to be monitored spontaneously send condition information to the monitoring apparatus 47 or 48, the frame identifier in each data frame is set to the group broadcast, the transmitter address section is set at its own apparatus address, and the transmission destination address section is set at the group address "A" or "B".

Figure 15:
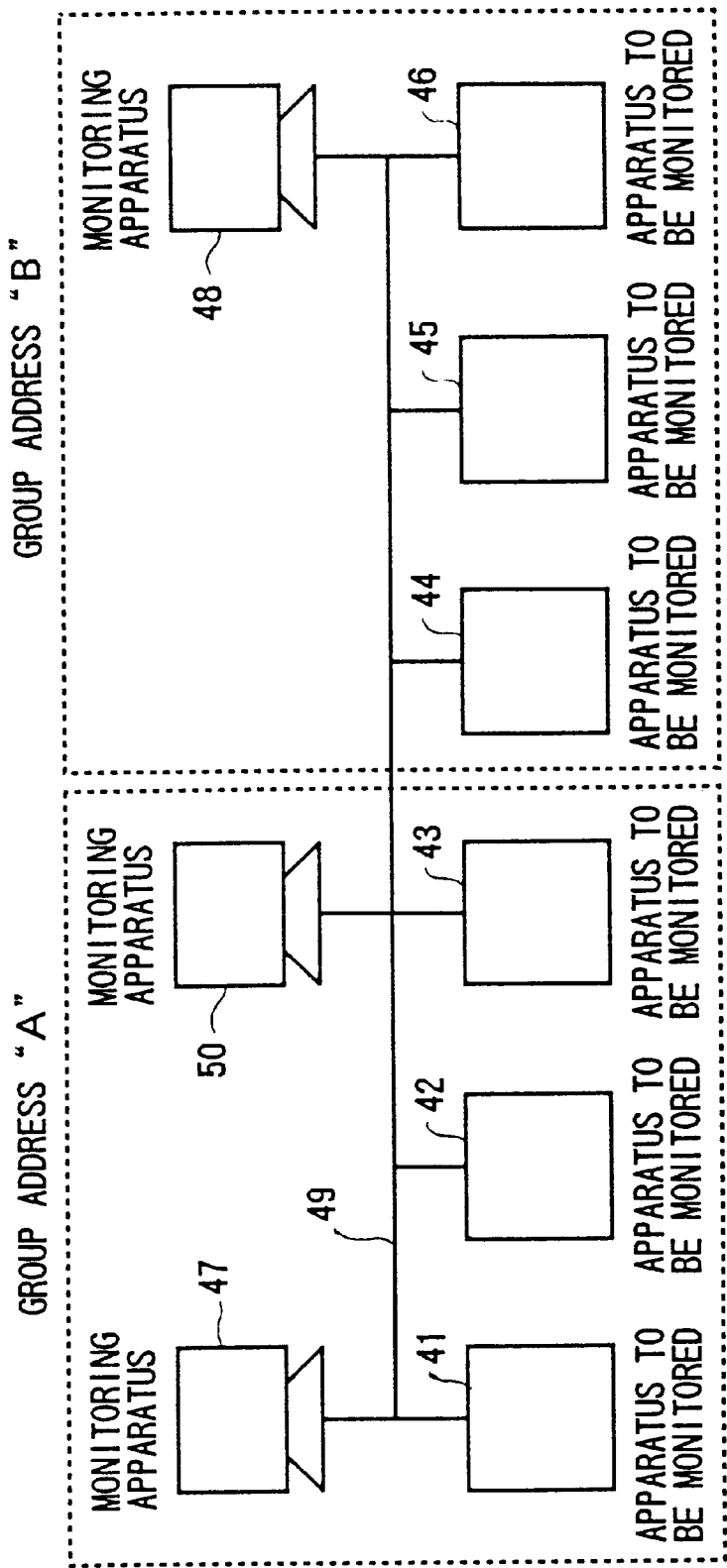
FIG. 15 shows a fifth example group configuration of a monitoring system of the present invention.

FIG. 15 shows a fifth example of the group configuration of the monitoring system of the present invention. This configuration is the same as the group configuration shown in FIG. 7, except that a monitoring apparatus 50 is added to the group A. The address holding unit 32 of the monitoring apparatus 50 holds its own apparatus address and the group address "A". When the apparatuses 41 to 43 to be monitored spontaneously send condition information to the monitoring apparatus 47, the frame identifier in each data frame is set to the group broadcast, the transmitter address section is set at its own address, and the transmission destination address section is set at the group address "A". This data frame is received by both monitoring apparatuses 47 and 50, so that the monitoring apparatus 50 can also monitor and control the apparatuses to be monitored in the group A. Thus, there is no need to add a new address to the data frame in each of the apparatuses to be monitored.

As can be seen from the above examples, each monitoring apparatus or each apparatus to be monitored can hold different group addresses, so that it can belong to different groups at the same time. In this manner, various groups can easily be formed in a monitoring system.

Figure 16:
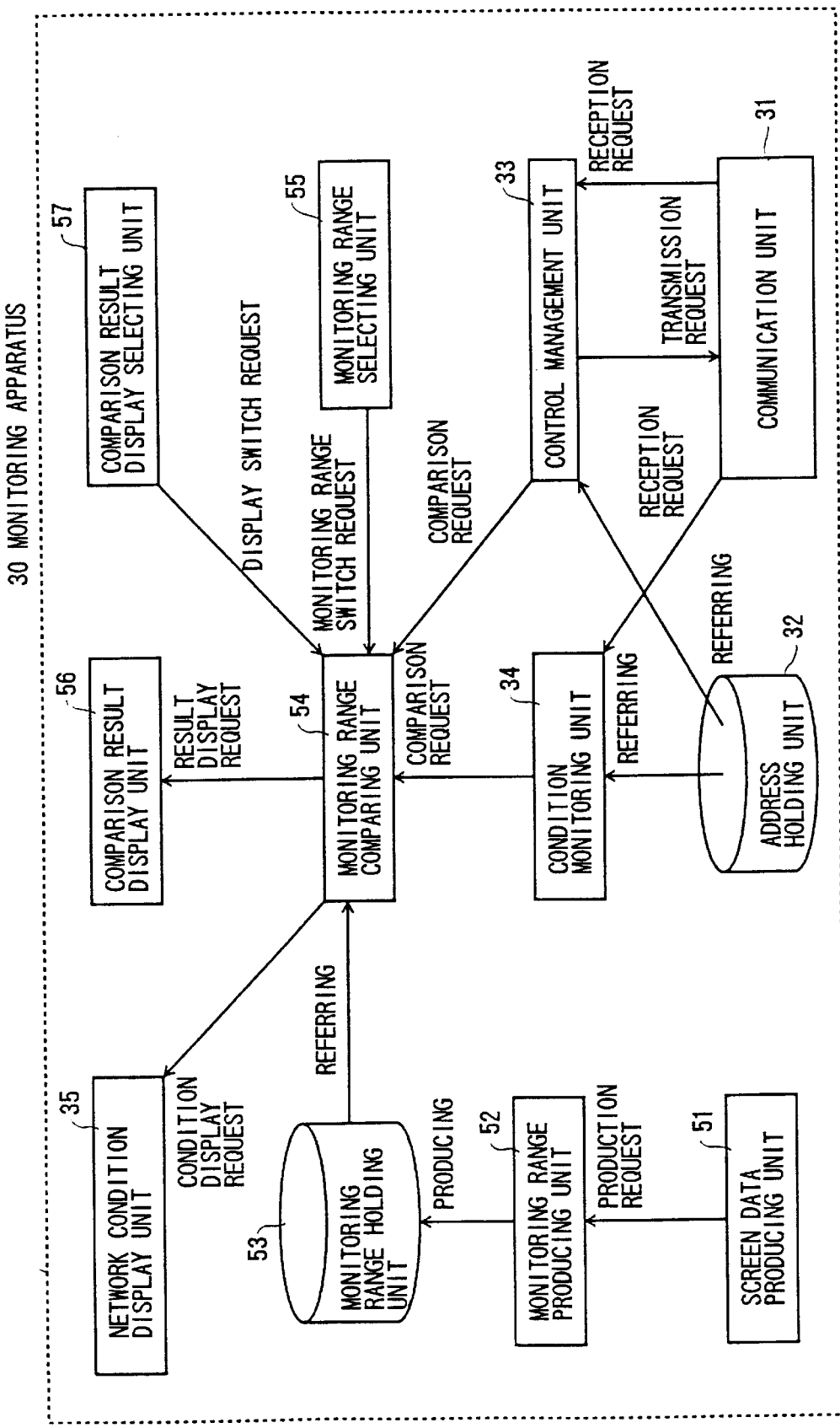
FIG. 16 is a block diagram of a second embodiment of a monitoring apparatus in a monitoring system of the present invention.

FIG. 16 is a block diagram of a second embodiment of a monitoring apparatus in the monitoring system of the present invention. In this figure, the same components as in FIG. 5 are indicated by the same reference numerals.

The communication unit 31 in the monitoring apparatus 30 communicates with apparatuses to be monitored. The address holding unit 32 stores the address of the monitoring apparatus 30 itself and the address of at least one group to which the monitoring apparatus 30 belongs. The control management unit 33 sends a process request to the communication unit 31, thereby making a transmission request. This transmission request is accompanied by the group address held in the address holding unit 32, and the communication unit 31 then transmits a data frame carrying the process request to the apparatuses to be monitored.

A screen data producing unit 51 produces screen data which indicates a range to be displayed by the network condition display unit 35, and sends a production request to a monitoring range producing unit 52. The monitoring range producing unit 52 produces the address of each apparatus in the monitoring range based on the screen data, and a monitoring range holding unit 53 stores the produced addresses.

When the communication unit 31 receives a data frame containing execution results from a monitored apparatus in response to the process request, a reception request is sent to the control management unit 33, and the control management unit 33 sends the reception request to a monitoring range comparing unit 54. When the communication unit 31 receives a data frame containing condition change information from the monitored apparatuses, a reception request is sent to the condition monitoring unit 34. The condition monitoring unit 34 then sends the reception request to the monitoring range comparing unit 54.

The monitoring range comparing unit 54 compares the transmitter address in the received data frame with the apparatus address held in the monitoring range holding unit 53. If the apparatus address held in the management unit holding unit 53 coincides with the transmitter address in the received data frame, the monitoring range comparing unit 54 requests the network condition display unit 35 to display the condition. If a display result switch request from a display result display selecting unit 57 is a display command, a comparison result display unit 56 displays the comparison result.

Figure 17:
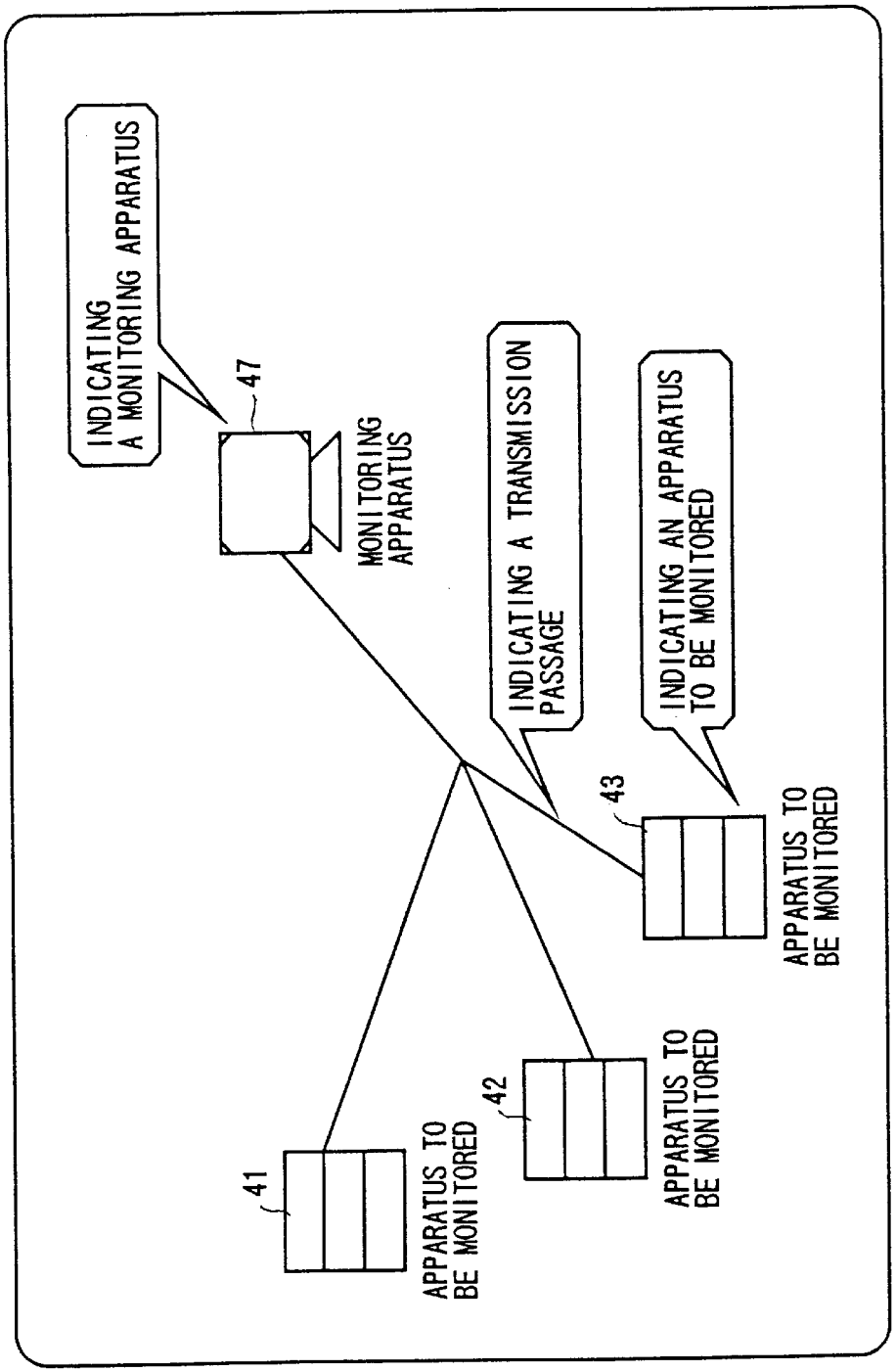
FIG. 17 shows first example screen data.
Figure 18:
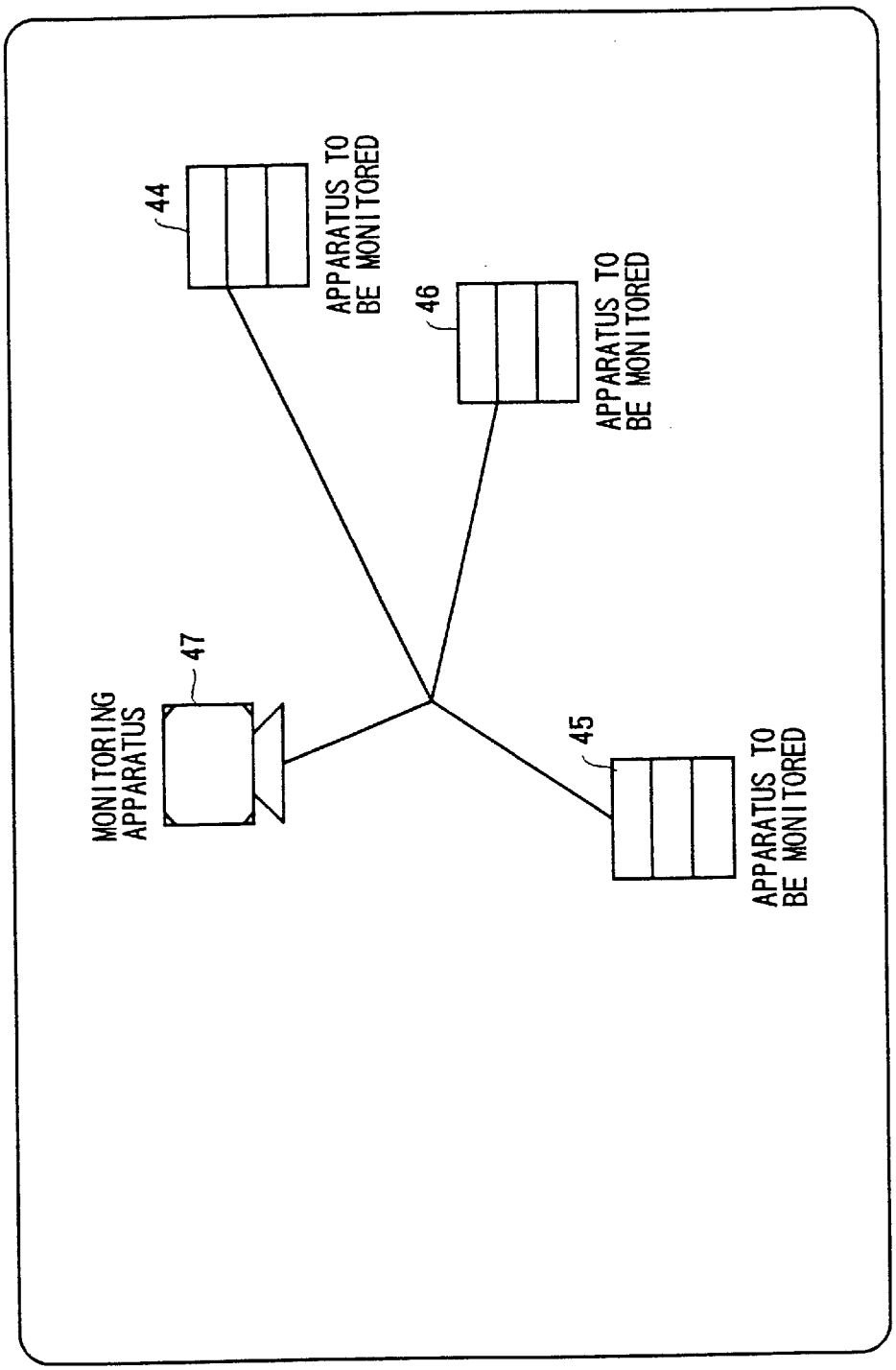
FIG. 18 shows second example screen data.
Figure 19:
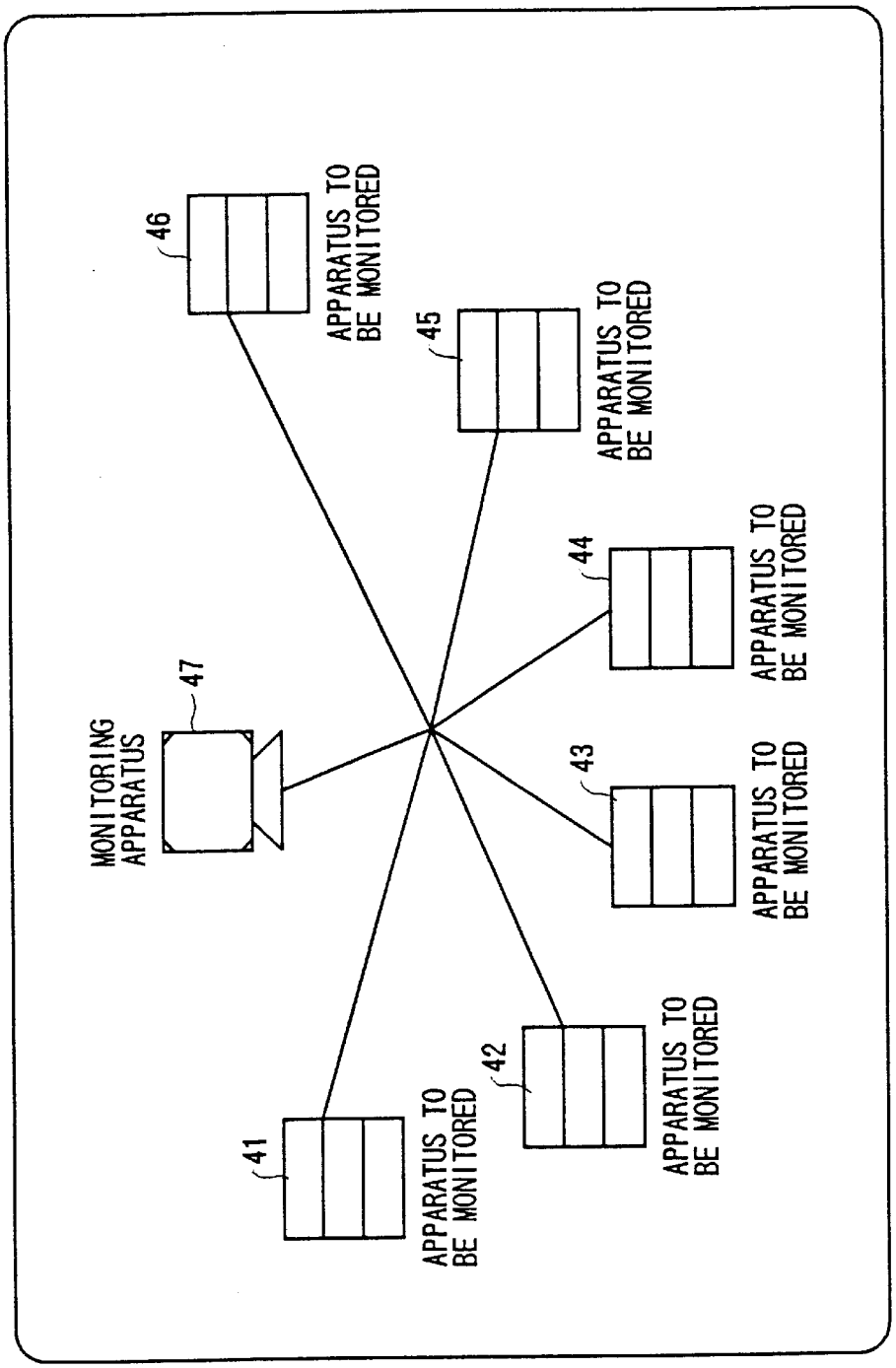
FIG. 19 shows third example screen data.

The following is a description of a case where the monitoring apparatus 47 monitors and controls the apparatuses 41 to 43 to be monitored as the group A, and the monitoring apparatus 47 also monitors and controls the apparatuses 44 to 46 to be monitored at the group B, as shown in FIG. 12. Here, the screen data producing unit 51 produces screen data in which the monitoring apparatus 47 is connected to the apparatuses 41 to 43 to be monitored, as shown in FIG. 17. Apparatus address data is then produced based on the screen data, and is stored as a first mode in the monitoring range holding unit 53. The screen data producing unit 51 also produces screen data in which the monitoring unit 51 is connected to the apparatuses 44 to 46 to be monitored, as shown in FIG. 18. Apparatus address data is then produced based on the screen data, and is stored as a second mode in the monitoring range holding unit 53. The screen data producing unit 51 further produces screen data in which the monitoring apparatus 47 is connected to the apparatuses 41 to 46 to be monitored, as shown in FIG. 19. Apparatus address data is then produced based on the screen data, and is stored as a third mode in the monitoring range holding unit 53.

In the case described above, a monitoring range selecting unit 55 shown in FIG. 16 makes a monitoring range selecting request to select one from the three modes held in the monitoring range holding unit 53.

Since the monitoring range data is produced based on the screen data as to the connection between the monitoring apparatus and the apparatuses to be monitored, the monitoring range can be visually recognized. Also, since one mode is selected for monitoring range comparison from the modes in the monitoring range data, the system configuration can be flexibly changed depending on the form of the network constituted by the apparatuses to be monitored.

Figure 20:
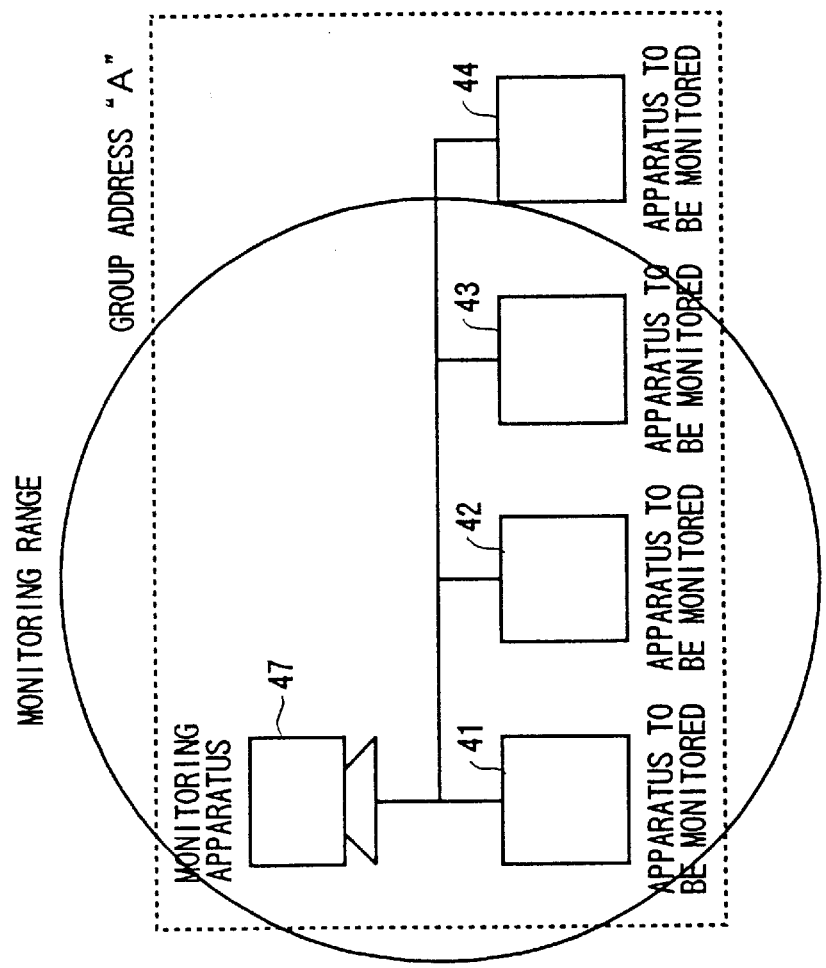
FIG. 20 illustrates a case where one apparatus to be monitored in the same group is situated outside the monitoring range.

FIG. 20 shows a case where the monitoring apparatus 47 and the apparatuses 41 to 44 to be monitored are put in the group A surrounded by a broken line, and the monitoring range holding unit 53 holds the apparatus addresses of the apparatuses 41 to 43 surrounded by a solid line. When the monitoring apparatus 47 receives a data frame specifying the group address "A" and the group broadcast from the apparatus 41 being monitored, the network condition display unit 35 displays the condition of the apparatus 41, because the transmitter address in the data frame coincides with one of the apparatus addresses held in the monitoring range holding unit 53.

When the monitoring apparatus 47 receives a data frame specifying the group address "A" and the group broadcast from the apparatus 44 being monitored, the comparison result display unit 56 displays a disaccord sign while the network condition display unit 35 does not display the condition of the apparatus 44, because the transmitter address in the received data frame does not coincides with any of the apparatus addresses held in the monitoring range holding unit 53.

As described above, since the condition of a monitored apparatus is displayed based on the contents of the data frame when the transmitter address in the data frame is included in the monitoring range data, it is possible to flexibly cope with various types of network constituted by apparatus to be monitored. Also, when the transmitter address in a transmitted data frame is not included in the monitoring range data, a disaccord sign is displayed, so that wrong monitoring range setting can easily be detected.

Figure 21:
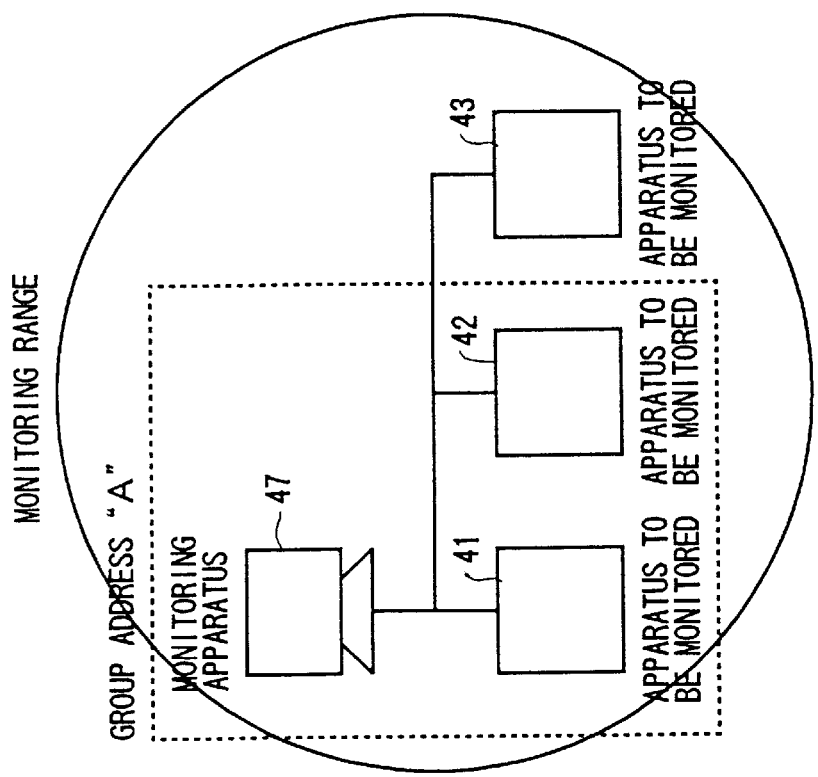
FIG. 21 illustrates a case where one apparatus to be monitored in another group is situated inside the monitoring range.

FIG. 21 shows a case where the monitoring apparatus 47 and the apparatuses 41 and 42 to be monitored are put in the group A surrounded by a broken line, and the monitoring range holding unit 53 holds the apparatus addresses of the apparatuses 41 to 43 surrounded by a solid line. In this case, the monitoring apparatus 47 transmits a data frame to the apparatuses 41 to 43 whose apparatus addresses are held in the monitoring range holding unit 53 by apparatus addressing. Each of the apparatuses 41 to 43 to be monitored then executes the control commands in the transmitted data frame, and reads out the group address held in the address holding unit 22. The group address is then put in the data section of a data frame to be transmitted to the monitoring apparatus 47.

The monitoring range comparing unit 54 of the monitoring apparatus 47 compares the group address in each data frame transmitted from the apparatuses 41 to 43 with the group address "A" held in the address holding unit 32. If the compared two group addresses do not coincide with each other, the comparing result display unit 56 displays a disaccord sign. Since each address holding unit 22 of the apparatuses 41 and 42 holds the group address "A", the comparing result display unit 56 does not display the disaccord sign. However, the address holding unit 22 of the apparatus 43 holds a different group address, and accordingly, the comparing result display unit 56 displays the disaccord sign. In this manner, wrong group address setting can easily be detected.

Figure 22:
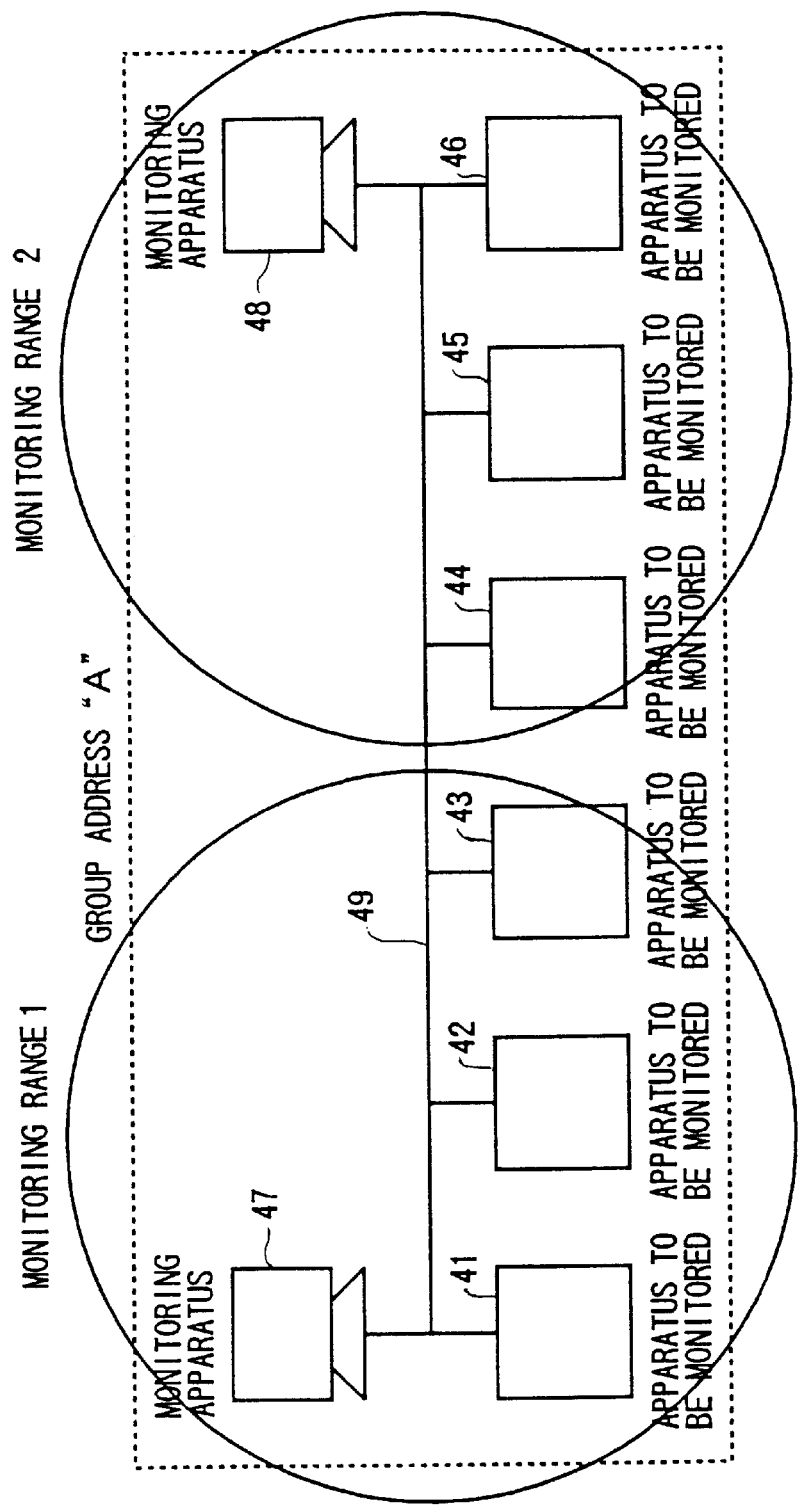
FIG. 22 illustrates a case where it is necessary to judge whether a comparison result (a disaccord sign) should be displayed.

FIG. 22 shows a case where the monitoring apparatuses 47 and 48 and the apparatuses 41 to 46 to be monitored are put in the group A surrounded by a broken line, and the monitoring range holding unit 53 of the monitoring apparatus 47 holds the apparatus addresses of the apparatuses 41 to 43 surrounded by a solid line while the monitoring range holding unit 53 of the monitoring apparatus 48 holds the apparatus addresses of the apparatuses 44 to 46 surrounded by another solid line. When the apparatus 44 transmits a data frame by group broadcasting in the group A, the network condition display unit 35 of the monitoring apparatus 48 displays the condition of the monitored apparatus 44, because the transmitter address in the data frame coincides with the apparatus address held in the monitoring range holding unit 53 of the monitoring apparatus 48.

On the other hand, the network condition display unit 35 of the monitoring apparatus 47 does not display the condition of the monitored apparatus 44, because the transmitter address in the data frame does not coincide with the apparatus address held in the monitoring range holding unit 53 of the monitoring apparatus 47. Here, the monitoring system itself is being operated properly, the comparison result display unit 56 should not display a disaccord sign. Instead, the comparison result display selecting unit 57 decides whether a comparison result should be displayed. If the comparison result should be displayed, the monitoring range comparing unit 54 makes a result display request to the comparison result display unit 56. If the comparison result should not be displayed, the monitoring range comparing unit 54 does not make a result display request to the comparison result display unit 56.

Figure 23:
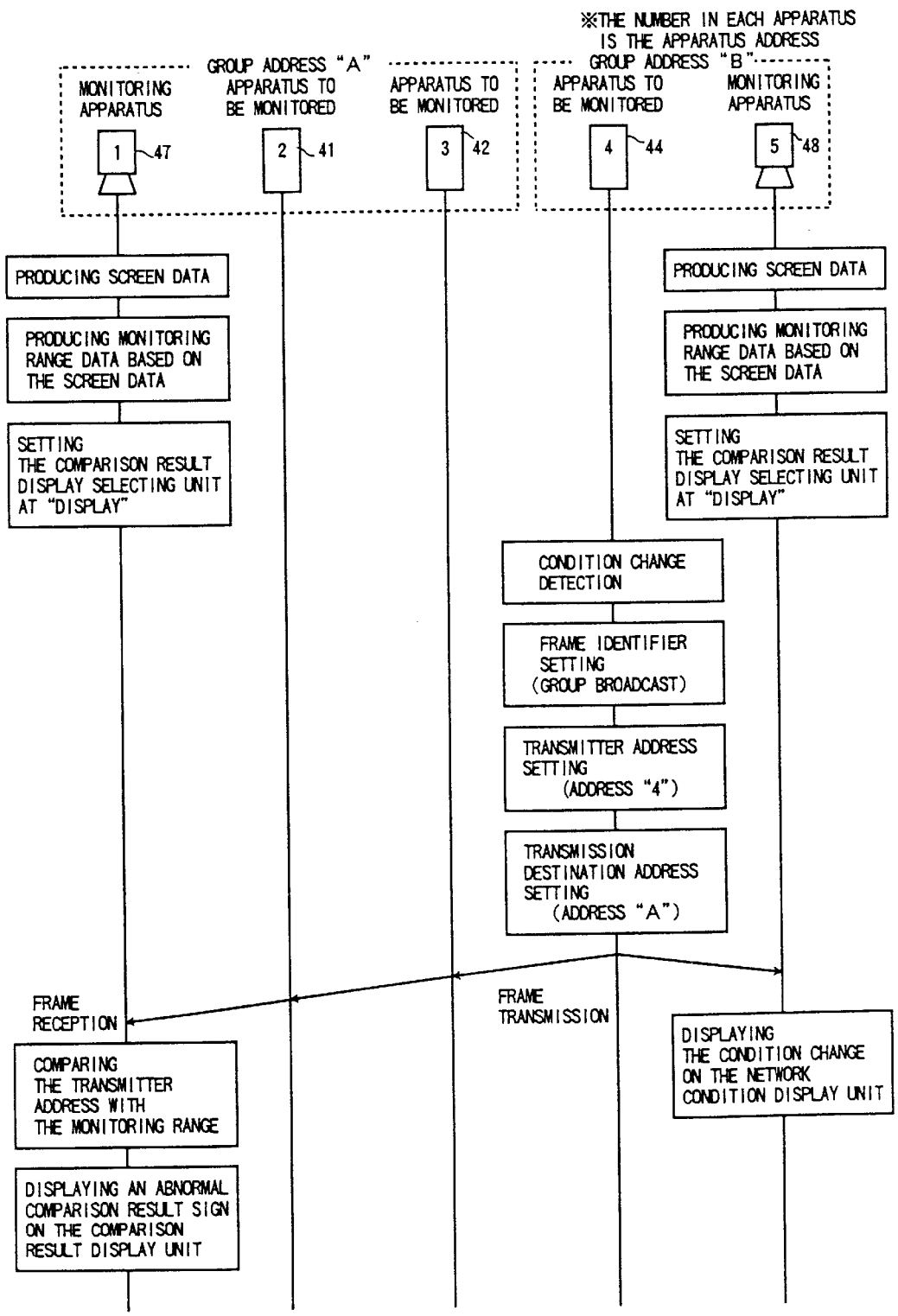
FIG. 23 is a sequential diagram of a case where one of the apparatuses to be monitored carries out a group broadcast in the system configuration shown in FIG. 22.

FIG. 23 is a sequential diagram of a case where the apparatus 44 to be monitored carries out a group broadcast in the system configuration shown in FIG. 22. As shown in FIG. 23, the monitoring apparatus 47 produces screen data by the screen data producing unit 51, and produces the apparatus addresses of the apparatuses 41 to 43 as monitoring range data based on the screen data by the monitoring range producing unit 52. The monitoring range data thus produced is stored in the monitoring range holding unit 53. The comparison result display selecting unit 57 sets a display sign of a comparison result. Likewise, the monitoring apparatus 48 produces screen data by the screen data producing unit 51, and then produces the apparatus address of the apparatus 44 as monitoring range data based on the screen data by the monitoring range producing unit 52. The monitoring range data thus produced is stored in the monitoring range holding unit 53. The comparison result display selecting unit 57 sets a display sign of a comparison result.

When the apparatus 44 to be monitored detects a condition change in itself, the apparatus 44 sends the condition change information to the communication unit 21, thereby spontaneously making a transmission request. Here, the frame identifier in the data frame is set to the group broadcast, the transmitter address is set to its own apparatus address "4", the transmission destination address is set at the group address "A", and the data on the condition change is put in the data section. The communication unit 21 then transmits the data frame through the monitoring line 49.

When the communication unit 31 of the monitoring apparatus 47 receives the data frame, the network condition display unit 35 does not display the condition of the apparatus 44, because the transmitter address in the data frame does not coincide with any of the apparatus addresses held in the monitoring range holding unit 53. The comparison result display unit 56 displays a disaccord sign (an abnormal comparison result sign).

When the communication unit 31 of the monitoring apparatus 48 receives the data frame he network condition display unit 35 displays the condition of the apparatus 44, because the transmitter address in the data frame coincides with the apparatus address held in the monitoring range holding unit 53.

Figure 24:
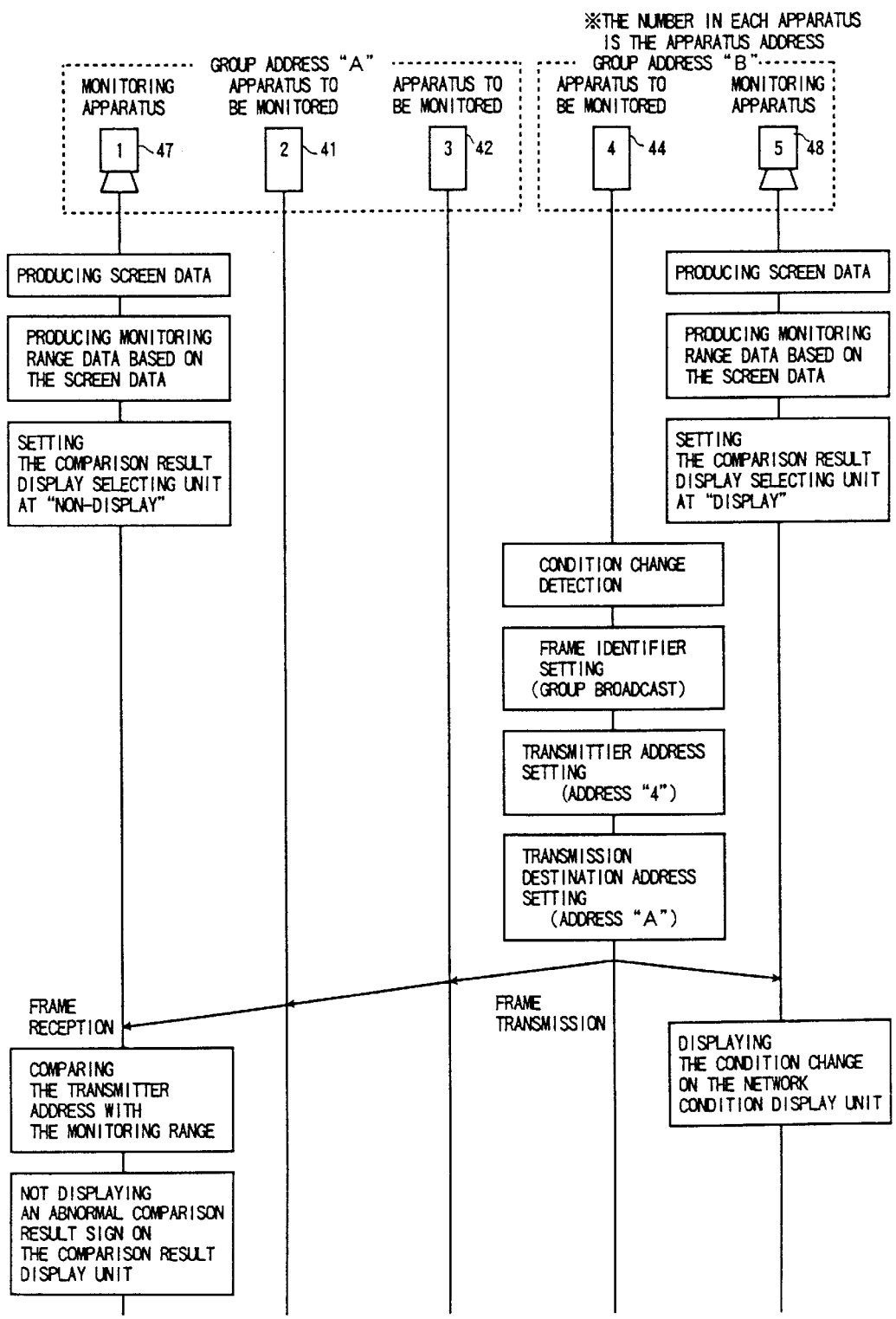
FIG. 24 is a sequential diagram of a case where one of the apparatuses to be monitored carries out a group broadcast in the system configuration shown in FIG. 22.

FIG. 24 is a sequential diagram of another case where the apparatus 44 to be monitored carries out a group broadcast in the system configuration shown in FIG. 22. As shown in FIG. 24, the monitoring apparatuses 47 and 48 each produce screen data, and then produce monitoring range data based on the screen data. The monitoring range data thus produced is stored in each monitoring range holding unit 53. The comparison result display selecting unit 57 of the monitoring apparatus 48 sets a display sign of a comparison result, while the comparison result display selecting unit 57 of the monitoring apparatus 47 sets a non-display sign of a comparison result.

When the communication unit 31 of the monitoring apparatus 47 receives the same data frame as in FIG. 23, the network condition display unit 35 does not display the condition of the apparatus 44, because the transmitter address in the data frame does not coincide with any of the apparatus addresses held in the monitoring range holding unit 53. The comparison result display unit 56 does not display a disaccord sign (an abnormal comparison result sign).

In this manner, when the transmitter address in a received data frame is not included in the monitoring range data, whether a disaccord comparison result should be displayed or not can be selected. Thus, unnecessary display of a disaccord sign can be prevented in a properly operated system.

The present invention is not limited to the specifically disclosed embodiments, but variations and modifications may be made without departing from the scope of the present invention.

The present application is based on Japanese priority application No. 10-253787, filed on Sep. 8, 1998, the entire contents of which are hereby incorporated by reference.

What is claimed is:

1. A monitoring system comprising:
   a monitoring apparatus monitoring a plurality of apparatuses;
   each of the monitoring apparatus and the apparatuses to be monitored having an address holding unit which holds a group address of a group to which each apparatus belongs;

a data frame to be transmitted between the monitoring apparatus and the apparatuses to be monitored having an identifier which specifies a communication between two apparatuses or group broadcast, the data frame being provided with a group address when the identifier specifies the group broadcast, wherein the address holding unit in each of the apparatuses to be monitored is capable of setting at any time a group address to which the associated apparatus to be monitored belongs; wherein display data is prepared for displaying, selectively, on a display device, a plurality of different connection relations among the monitoring apparatus and the apparatuses to be monitored, and for each of the thus-prepared display data of the plurality of different connection relations, monitoring range data is produced for defining a monitoring range of the respective apparatuses to be monitored, said monitoring range data being held in a monitoring range holding unit of the monitoring apparatus; and wherein a selection is made to display a disaccord notice on the display when the data frame is provided with the group address and a transmitter address identifying an apparatus to be monitored that transmitted the data frame, and the transmitting apparatus to be monitored is not defined in the monitoring range data.

2. The monitoring system as claimed in claim 1, wherein the address holding unit in the monitoring apparatus holds different group addresses.

3. The monitoring system as claimed in claim 1, wherein the monitoring apparatus comprises:

a monitoring range holding unit which stores apparatus addresses of the apparatuses to be monitored as monitoring range data;

a group address comparing unit which judges whether a group address held in an apparatus to be monitored of an apparatus stored in the monitoring range holding unit coincides with the group address held in the address holding unit of the monitoring apparatus; and a group address disaccord display unit which indicates a comparison result when the group address comparing unit judges that the two group addresses do not coincides with each other.

4. The monitoring system as claimed in claim 1, wherein, in addition to monitoring the plurality of apparatuses, the monitoring apparatus performs a predetermined control operation on the apparatuses to be monitored.

5. The monitoring system as claimed in claim 1, wherein the monitoring apparatus determines whether a group address transmitted by one of the plurality of apparatuses to the monitoring apparatus is correct by comparing the transmitted group address with the monitoring range data.

6. The monitoring system as claimed in claim 1, wherein address setting in each of the apparatuses to be monitored is achieved as a result of an intra-group broadcasting control scheme.

7. A monitoring apparatus which monitors a plurality of apparatuses, comprising:

a monitoring range producing unit which selectively produces addresses for each of one of more of the plurality of apparatuses indicated by monitoring range data;

a monitoring range holding unit which selectively holds the produced apparatus addresses of the plurality of apparatuses to be monitored as determined by the monitoring range data;

a monitoring range comparing unit which judges whether a transmitter address in a transmitted data frame is held among the produced apparatus addresses held in the monitoring range holding unit;

a condition display unit which selectively displays display data for a plurality of different connection relations among the monitoring apparatus and the apparatuses to be monitored, and for each of the thus-prepared display data of the plurality of different connection relations, monitoring range data is produced for defining a monitoring range of the respective apparatuses to be monitored; and a comparison result display unit for displaying a disaccord notice on the display when a data frame is received with a group address of the monitoring apparatus and a transmitter address identifying an apparatus to be monitored that transmitted the data frame, and the transmitting apparatus to be monitored is not defined in the monitoring range data.

8. The monitoring apparatus as claimed in claim 7, further comprising an input unit which inputs a relationship between said monitoring apparatus and each apparatus to be monitored in the form of an image, wherein the monitoring range holding unit stores the monitoring range data produced based on the image data inputted by the input unit.

9. The monitoring apparatus as claimed in claim 8, wherein the monitoring range holds monitoring range data of various kinds, said monitoring apparatus further comprising a monitoring range selecting unit which selects from the monitoring range data of various kinds to be used in the monitoring range comparing unit.

10. The monitoring apparatus as claimed in claim 7, further comprising a comparison result display unit which displays a comparison result from the monitoring range comparing unit when the transmitter address in the transmitted data frame is not included in the monitoring range data in the monitoring range holding unit.

11. The monitoring apparatus as claimed in claim 10, further comprising a comparison result display selecting unit which determines whether the comparison result display unit should display a comparison result.

12. The monitoring apparatus as claimed in claim 7, wherein the monitoring apparatus further comprises means for apparatus performing a predetermined control operation on the plurality of apparatuses to be monitored.

13. The monitoring apparatus as claimed in claim 7, wherein the monitoring range comparing unit determines whether a group address in the transmitted data frame is correct by comparing the transmitted data frame with the monitoring range data.

14. The monitoring apparatus as claimed in claim 7, wherein address setting in each of the apparatuses to be monitored is achieved as a result of an intra-group broadcasting control scheme.

15. A method of monitoring in a monitoring system in which a monitoring apparatus monitors a plurality of apparatuses, comprising the steps of:

storing a group address of a group to which each of the monitoring apparatus and the apparatuses to be monitored belongs;

setting an identifier in a data frame to be transmitted between the monitoring apparatus and the apparatuses to be monitored, said identifier specifying communication between two apparatuses or group broadcast;

storing the group address and a transmitter address in the data frame when the identifier specifies the group broadcast; wherein each of the monitoring apparatus and the apparatuses to be monitored may belong to a group according to a setting which may be made at any time;

displaying, selectively, on a display device, display data for a plurality of different connection relations among the monitoring apparatus and the apparatuses to be monitored, and for each of the thus-prepared display data of the plurality of different connection relations, monitoring range data is produced for defining a monitoring range of the respective apparatuses to be monitored; wherein a selection is made to display a disaccord notice on the display when the data frame is provided with the group address and a transmitter address identifying an apparatus to be monitored that transmitted the data frame, and the transmitting apparatus to be monitored is not defined in the monitoring range data.

16. The method as claimed in claim 15, further comprising the steps of:

storing apparatus addresses of the apparatuses to be monitored as monitoring range data in the monitoring apparatus;

comparing a transmitter address held in the transmitted data frame with the monitoring range data; and displaying condition of a monitored apparatus based on contents of the transmitted data frame when the transmitter address in included in the monitoring range data.

17. The method as claimed in claim 16, further comprising the steps of:

inputting a relationship between the monitoring apparatus and each apparatus to be monitored in the form of an image; and storing the monitoring range data produced from the inputted image data.

18. The method as claimed in claim 17, further comprising the steps of:

storing monitoring range data of various kinds in the monitoring apparatus; and deciding which kind of monitoring range data should be compared with the transmitter address held in the transmitted data frame.

19. The method as claimed in claim 16, further comprising the step of displaying a comparison result when the transmitter address held in the transmitted data frame is not included in the monitoring range data.

20. The method as claimed in claim 16, further comprising the steps of:

judging whether the group address of the monitoring apparatus coincides with a group address held in a monitored apparatus of an apparatus address held in the monitoring range data; and displaying a comparison result when the two group addresses do not coincide with each other.

21. The method as claimed in claim 19, further comprising the step of: deciding whether the comparison result should be displayed by the monitoring apparatus.

22. The method as claimed in claim 15, further comprising the step of:

performing a predetermined control operation on the plurality of apparatuses to be monitored.

23. The method as claimed in claim 15, further comprising the step of:

determining whether a group address transmitted by one of the plurality of apparatuses to the monitoring apparatus is correct by comparing the transmitted group address with the monitoring range data.

24. The method as claimed in claim 15, further comprising the step of:

setting an address in each of the respective apparatuses to be monitored by using an intra-group broadcasting control scheme.

* * * * *